United States Patent
Jun

(10) Patent No.: US 11,170,778 B2
(45) Date of Patent: Nov. 9, 2021

(54) CONVERSATIONAL CONTROL SYSTEM AND METHOD FOR REGISTERING EXTERNAL DEVICE

(71) Applicant: SAMSUNG ELECTRONICS CO., LTD., Suwon-si (KR)

(72) Inventor: Haesik Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 16/733,741

(22) Filed: Jan. 3, 2020

(65) Prior Publication Data
US 2020/0219507 A1    Jul. 9, 2020

(30) Foreign Application Priority Data
Jan. 4, 2019  (KR) .......................... 10-2019-0001304

(51) Int. Cl.
*G10L 15/22* (2006.01)
*G10L 15/30* (2013.01)
*G06N 5/02* (2006.01)

(52) U.S. Cl.
CPC ............. *G10L 15/22* (2013.01); *G06N 5/02* (2013.01); *G10L 15/30* (2013.01); *G10L 2015/223* (2013.01)

(58) Field of Classification Search
USPC .................................................. 704/1–504
See application file for complete search history.

(56) References Cited

U.S. PATENT DOCUMENTS

| 7,716,056 | B2* | 5/2010 | Weng ...................... G10L 15/22 704/275 |
| 7,738,662 | B2* | 6/2010 | Asano ..................... G06F 21/10 380/277 |
| 7,904,297 | B2* | 3/2011 | Mirkovic ................ G06F 40/40 704/257 |
| 9,183,560 | B2* | 11/2015 | Abelow .................. G06Q 10/10 |
| 9,698,999 | B2* | 7/2017 | Mutagi ............... H04L 12/2829 |
| 10,425,411 | B2* | 9/2019 | Huang .................. H04L 9/3268 |

(Continued)

FOREIGN PATENT DOCUMENTS

| KR | 10-0852305 | 8/2008 |
| KR | 10-2018-0133526 | 12/2018 |

(Continued)

OTHER PUBLICATIONS

International Search Report and Written Opinion dated Apr. 23, 2020 in counterpart International Patent Application No. PCT/KR2020/000151.

*Primary Examiner* — Marcus T Riley
(74) *Attorney, Agent, or Firm* — Nixon & Vanderhye, P.C.

(57) ABSTRACT

Provided are a conversational control system and method for registering an external device. The method performed by the conversational robot device, includes: receiving profile information from a plurality of external devices; selecting a service category of a service provided by the conversational robot device; selecting at least one external device related to the selected service category from among the plurality of external devices; generating a function tree including at least some functions of the selected at least one external device; and registering the function tree and the service category with a server.

20 Claims, 19 Drawing Sheets

(56) References Cited

U.S. PATENT DOCUMENTS

| | | | |
|---|---|---|---|
| 10,749,733 B2 | 8/2020 | Na et al. | |
| 2012/0069131 A1* | 3/2012 | Abelow | G06Q 10/067 348/14.01 |
| 2013/0290234 A1* | 10/2013 | Harris | G06N 5/022 706/46 |
| 2018/0158458 A1* | 6/2018 | Weber | G10L 15/30 |
| 2018/0277113 A1* | 9/2018 | Hartung | G10L 15/22 |
| 2019/0012141 A1 | 1/2019 | Piersol et al. | |
| 2020/0219507 A1* | 7/2020 | Jun | G06N 3/006 |

FOREIGN PATENT DOCUMENTS

| | | |
|---|---|---|
| KR | 10-2019-0103682 | 9/2019 |
| KR | 10-2079979 | 2/2020 |
| WO | 2018/235831 | 12/2018 |

\* cited by examiner

FIG. 6

Profile
- Device Type
- Device Name
- Device Control
    - Communication Interface : HW INTERFACE SUCH AS WIFI, BLE, ZIGBEE
    - Support Protocol : PROTOCOL USED FOR EACH HW INTERFACE
    - Control Channel : COMMANDS ARE TRANSMITTED AND RECEIVED
      INFORMATION ABOUT CONTROL CHANNEL (PROTOCOL, PORT NUMBER)
      VIA WHICH USED
    - Authentication : METHOD FOR DEVICE AUTHENTICATION
- Attribute List: [attr_tree_1, attr_tree_2, ⋯ ]
    - SET OF ATTRIBUTE TREES (E.G., PROFILE INFORMATION)
      HAVING ACTUAL FUNCTIONS
- Functions : FUNCTION LIST (JSON)
    - DEFINITION OF FUNCTIONS OTHER THAN CONTROL VIA ATTRIBUTE

FIG. 7

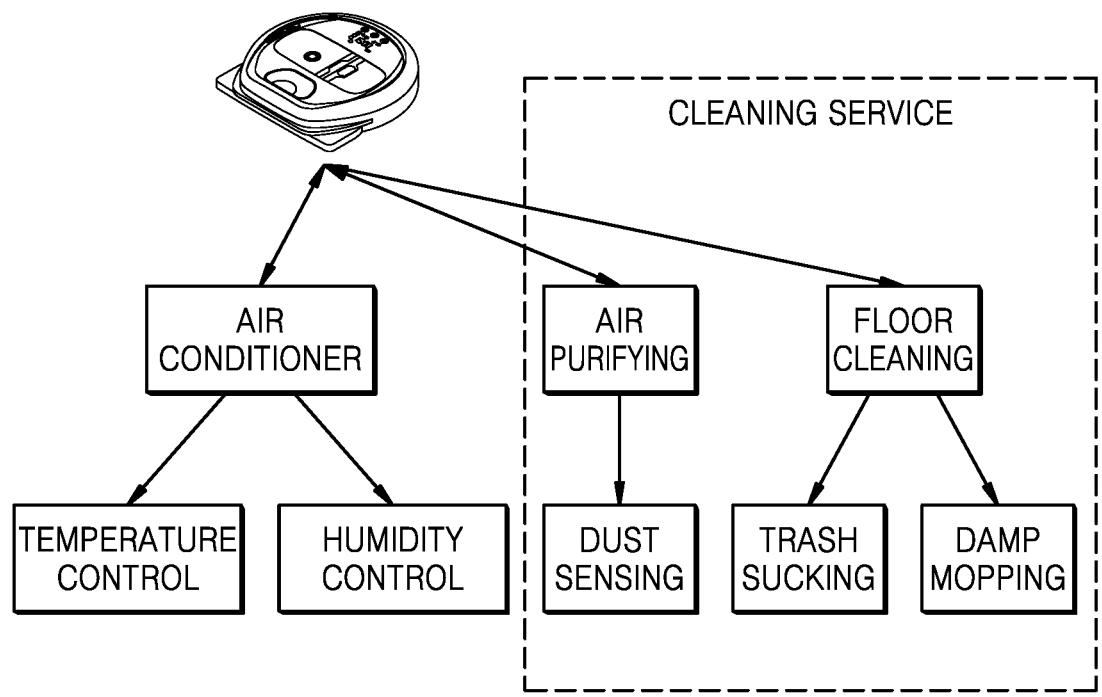

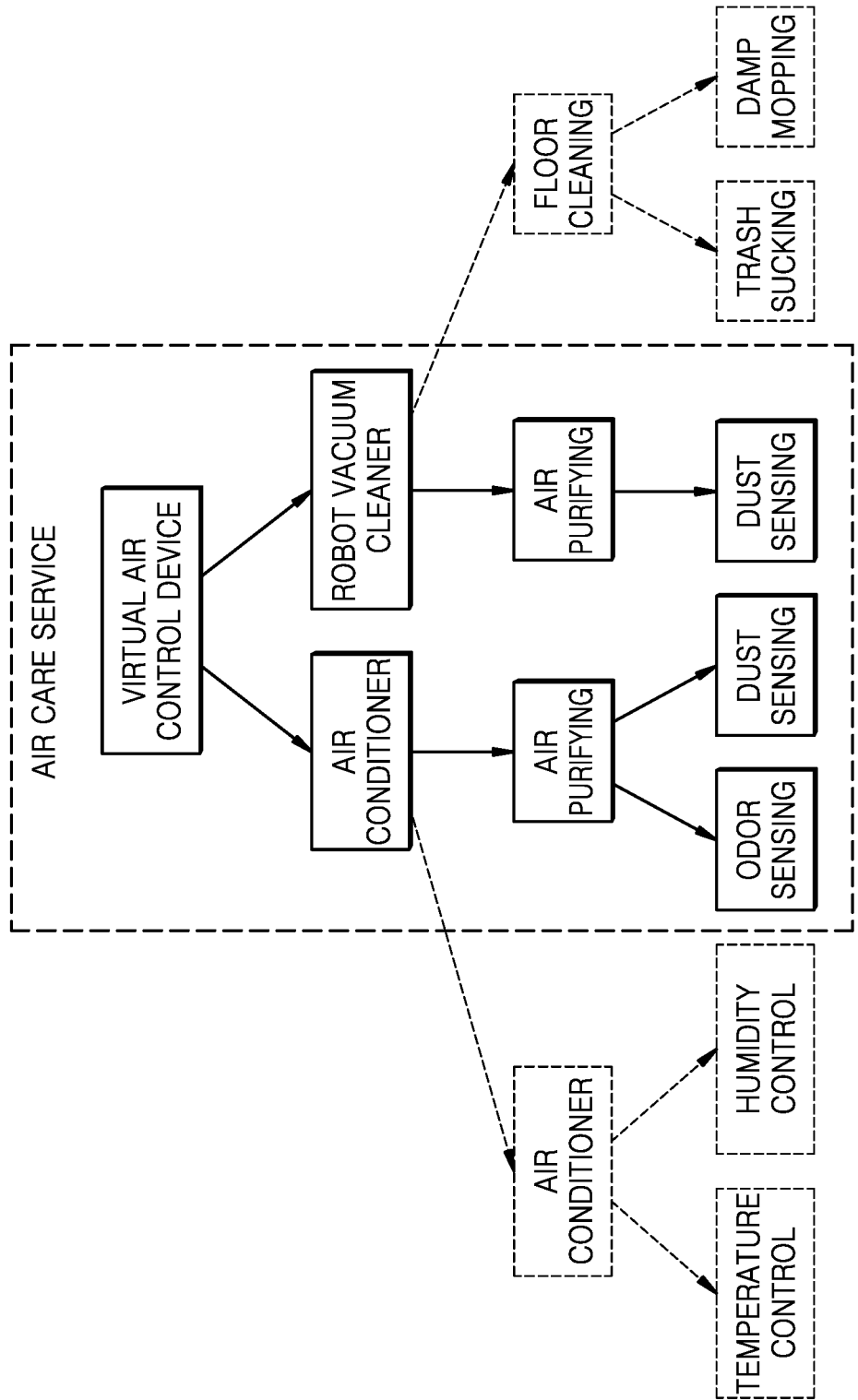

FIG. 10

```
■ Attribute tree
        Type : get/set function
        Name : get/set function
        Descriptor : get/set function
        Tag : get/set function
        Parent : get/set function
        Get : input ([param]) / output (one time data return)
        Set : input ([param], value) / output (result, one time data return)
        Monitor : input ([param], monitor time) / output(result, continuous)
        Event : input ([param], condition ) / output (result)
        Control: input (param], condition) / output (resutl)
        Attribute List : [···]
```

CONVERSATIONAL CONTROL SYSTEM AND METHOD FOR REGISTERING EXTERNAL DEVICE

CROSS-REFERENCE TO RELATED APPLICATION

This application is based on and claims priority under 35 U.S.C. § 119 to Korean Patent Application No. 10-2019-0001304, filed on Jan. 4, 2019, in the Korean Intellectual Property Office, the disclosure of which is incorporated by reference herein in its entirety.

BACKGROUND

1. Field

The disclosure relates to a conversational control system and method for registering and controlling an external device.

2. Description of Related Art

An artificial intelligence (AI) system may refer to a computer system that enables machines to become smart by learning and making decisions on their own, compared to an existing rule-based smart system. The AI system may improve its recognition rates and is capable of understanding a user's preferences more accurately through experience. Thus, existing rule-based smart systems are increasingly being replaced by deep learning-based AI systems.

AI technology may include machine learning (deep learning) and element technologies using the machine learning. Machine learning may refer to an algorithmic technique for autonomously classifying/learning features of input data, and element technologies are technologies for simulating functions of a human brain such as cognition and decision-making using machine learning algorithms and include technical fields such as linguistic understanding, visual understanding, reasoning/prediction, knowledge representation, motion control, etc.

Various technical fields to which AI technology may be applied are, for example, as follows. Linguistic understanding may refer to a technology for recognizing human language/characters for application/processing and includes natural language processing, machine translation, a dialog system, question answering, speech recognition/synthesis, etc. Visual understanding may refer to a technology for recognizing and processing an object, in the same way as performed by a human visual system, and includes object recognition, object tracking, image retrieval, person recognition, scene understanding, spatial understanding, image enhancement, etc. Reasoning/prediction may refer to a technology for judging information and logically inferring and predicting new information and includes knowledge/probability-based interference, optimization prediction, preference-based planning, recommendations, etc. Knowledge representation may refer to a technology for automatically processing information about human experience as knowledge data and includes knowledge construction (data generation/classification), knowledge management (data utilization), etc. Motion control may refer to a technology for controlling autonomous driving of a vehicle and motion of a robot and includes movement control (navigation, collision avoidance, and travelling), manipulation control (action control), etc.

Meanwhile, the demand for easy control of various external devices has been increasing, and accordingly, there is a need for a technology for effectively registering various types of external devices using various formats of data and efficiently controlling various external devices by appropriately combining functions of the external devices.

SUMMARY

Embodiments of the disclosure provide a conversational control system and method, which are capable of effectively controlling external devices by matching a function tree including some functions of the external devices to a specific service category and registering the function tree and the service category.

Embodiments of the disclosure also provide a conversational control system and method capable of generating a function tree by receiving pieces of profile information in a predetermined format from external devices and combining functions of the external devices.

Embodiments of the disclosure also provide a conversational control system and method capable of efficiently controlling an external device by sharing function trees corresponding to a service category.

Additional example aspects will be set forth in part in the description which follows and, in part, will be apparent from the description.

According to an example embodiment of the disclosure, a method, performed by a conversational robot device, of registering an external device includes: receiving pieces of profile information from a plurality of external devices; selecting a service category of a service provided by the conversational robot device; selecting at least one external device related to the selected service category from among the plurality of external devices; generating a function tree including at least some functions of the selected at least one external device; and registering the function tree and the service category with a server.

According to another example embodiment of the disclosure, a conversational robot device configured to register an external device includes: a communication interface comprising communication circuitry configured to communicate with a plurality of external devices and a server; a memory configured to store one or more instructions; and a processor configured to execute the one or more instructions to control the conversational robot device to: receive pieces of profile information from the plurality of external devices; select a service category of a service provided by the conversational robot device; select at least one external device related to the selected service category from among the plurality of external devices; generate a function tree including at least some functions of the selected at least one external device; and register the function tree and the service category with the server.

According to another example embodiment of the disclosure, a computer program product includes a non-transitory computer readable recording medium having stored therein a program for performing the method of registering an external device according to an example embodiment of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 6 is a diagram illustrating an example of profile information of an external device, according to various embodiments of the disclosure;

FIG. 7 is a diagram illustrating an example of a function tree of an external device, corresponding to a specific service category, according to various embodiments of the disclosure;

FIG. 8 is a diagram illustrating an example of a function tree of a virtual device generated based on functions of a plurality of external devices, according to various embodiments of the disclosure;

FIG. 10 is a diagram illustrating an example of data included in a function tree, according to various embodiments of the disclosure;

DETAILED DESCRIPTION

Figure 1:
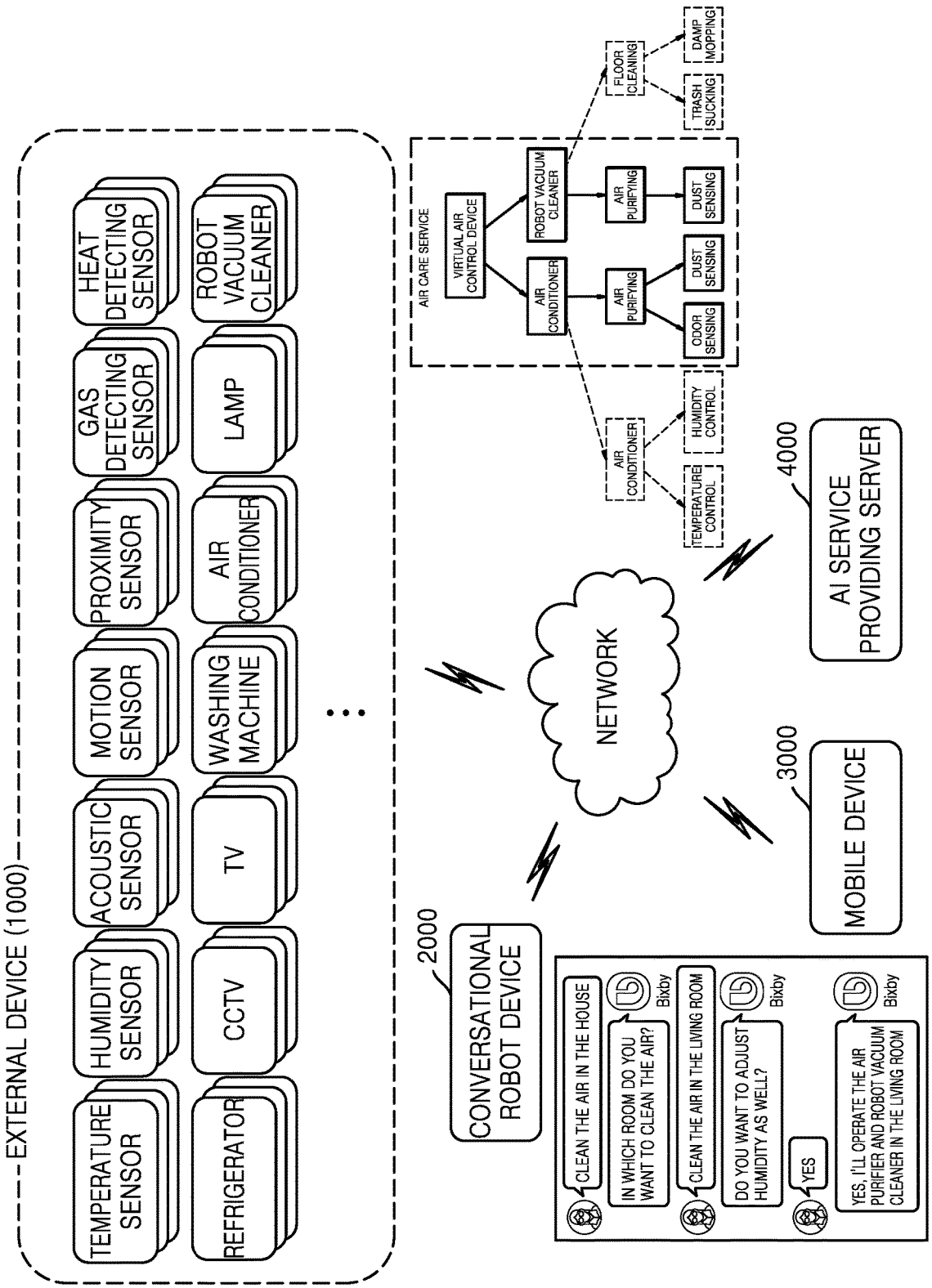
FIG. 1 is a diagram illustrating an example conversational control system for registering an external device, according to various embodiments of the disclosure.

Various example of the disclosure will now be described in greater detail below with reference to the accompanying drawings. However, the disclosure may have different forms and should not be understood as being limited to the example embodiments of the disclosure set forth herein. Parts not related to the disclosure may be omitted for clarity, and like reference numerals denote like elements throughout.

Throughout the disclosure, the expression "at least one of a, b or c" indicates only a, only b, only c, both a and b, both a and c, both b and c, all of a, b, and c, or variations thereof.

Throughout the disclosure, it will be understood that when an element is referred to as being "connected" or "coupled" to another element, it can be "directly connected" to or "electrically coupled" to the other element with one or more intervening elements interposed therebetween. Throughout the disclosure, when a part "includes" or "comprises" an element, unless there is a particular description contrary thereto, the part may further include other elements, not excluding the other elements.

According to the disclosure, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

Hereinafter, various embodiments of the disclosure will be described in greater detail with reference to the accompanying drawings.

FIG. 1 is a diagram illustrating an example conversational control system for registering an external device 1000 according to various embodiments of the disclosure.

Referring to FIG. 1, the conversational control system may include one or more external devices 1000, a conversational robot device 2000, a mobile device 3000, and an AI service providing server 4000.

The conversational control system may provide AI services for controlling the one or more (external devices 1000 in response to a user's request and register and control various types of the one or more external devices 1000). The conversational robot device 2000 may register each external device 1000 with the AI service providing server 4000 or the conversational robot device 2000 and control the external device 1000 in response to a user's voice input. The conversational robot device 2000 may receive profile information regarding attributes and functions of the external device 1000 from the external device 1000, generate function trees related to the external device 1000, and register the function trees with the AI service providing server 4000 or the conversational robot device 2000. A function tree may be generated for each category of AI services by hierarchically organizing functions of the external device 1000. The conversational robot device 2000 may provide a conversational service to a user using a function tree of the external device 1000. The AI services may include conversational services for controlling the external device 1000, and may include a service such as a voice assistance service but are not limited thereto.

The AI service providing server 4000 may provide the conversational robot device 2000 with an application programming interface (API) for a conversational service, and the conversational robot device 2000 may use the API received from the AI service providing server 4000 to register and control the external device 1000.

The conversational robot device 2000 may share a function tree of the external device 1000 with another conversational robot device (not shown) by registering the function tree with the AI service providing server 4000. Another conversational robot device (not shown) may use a function tree of the external device 1000 in order to control another external device (not shown).

The AI service providing server 4000 may provide, via a market service, a function tree of the external device 1000 to another conversational robot device (not shown) and the conversational robot device 2000. A function tree of the external device may be generated for each specific category of the AI services and provided to another conversational robot device (not shown) and the conversational robot device 200 in a manner similar to that in an app market (not shown).

The mobile device 3000 may set a function of the conversational robot device 2000 or control the conversational robot device 2000 to implement a conversational service. The mobile device 3000 may provide the user with a graphical user interface (GUI) for the conversational service.

For example, the one or more external devices 1000 may include, without limitation, a temperature sensor, a humidity sensor, an acoustic sensor, a motion sensor, a proximity sensor, a gas detecting sensor, a heat detecting sensor, a refrigerator, a closed-circuit television (CCTV), a TV, a washing machine, a dehumidifier (e.g., air conditioner), a lamp, a robot vacuum cleaner, etc., but are not limited thereto.

For example, the conversational robot device 2000 may include an AI speaker responding to a user's voice input, but is not limited thereto. Examples of the conversational robot device 2000 may include, but are not limited to, a gateway device, a smartphone, a tablet PC, a PC, a smart TV, a mobile phone, a personal digital assistant (PDA), a laptop, a media player, a micro server, a global positioning system (GPS), an electronic book terminal, a digital broadcasting terminal, a navigation device, a kiosk, an MP3 player, a digital camera, home appliances, and other mobile or non-mobile computing devices, or the like. In addition, the conversational robot device 2000 may be a wearable device such as, for example, and without limitation, a watch, glasses, a hair band, a ring, or the like, having a communication function and a data processing function. However, embodiments of the disclosure are not limited thereto, and the conversational robot device 2000 may include any apparatus capable of receiving a user input and controlling the external device 1000.

The AI service providing server 4000 may be a server related to the AI services. The AI service providing server 4000 may be a server used to provide the AI services in the conversational control system, and may be implemented in various forms by various devices.

A network may include, for example, and without limitation, a local area network (LAN), a wide area network (WAN), a value added network (VAN), a mobile radio communication network, a satellite communication network, or the like, and any combination thereof. Furthermore, the network may include a data communication network in a comprehensive sense configured to enable smooth communication across network entities shown in FIG. 1 and include, for example, and without limitation, a wired Internet, a wireless Internet, a mobile wireless communication network, or the like. Examples of a wireless communication technology may include, but are not limited to, a wireless LAN (WLAN) or Wi-Fi, Bluetooth, Bluetooth Low Energy (BLE), ZigBee, Wi-Fi Direct (WFD), ultra wideband (UWB), infrared communication (Infrared Data Association (IrDA)), Near Field Communication (NFC), or the like.

While it has been described in the disclosure that the external device 1000 is managed by receiving a user's voice input, embodiments of the disclosure are not limited thereto. The external device 1000 may be managed in response to various inputs such as, for example, and without limitation, text input, voice input, gesture input, or the like, that may be given by the user.

Figure 2:
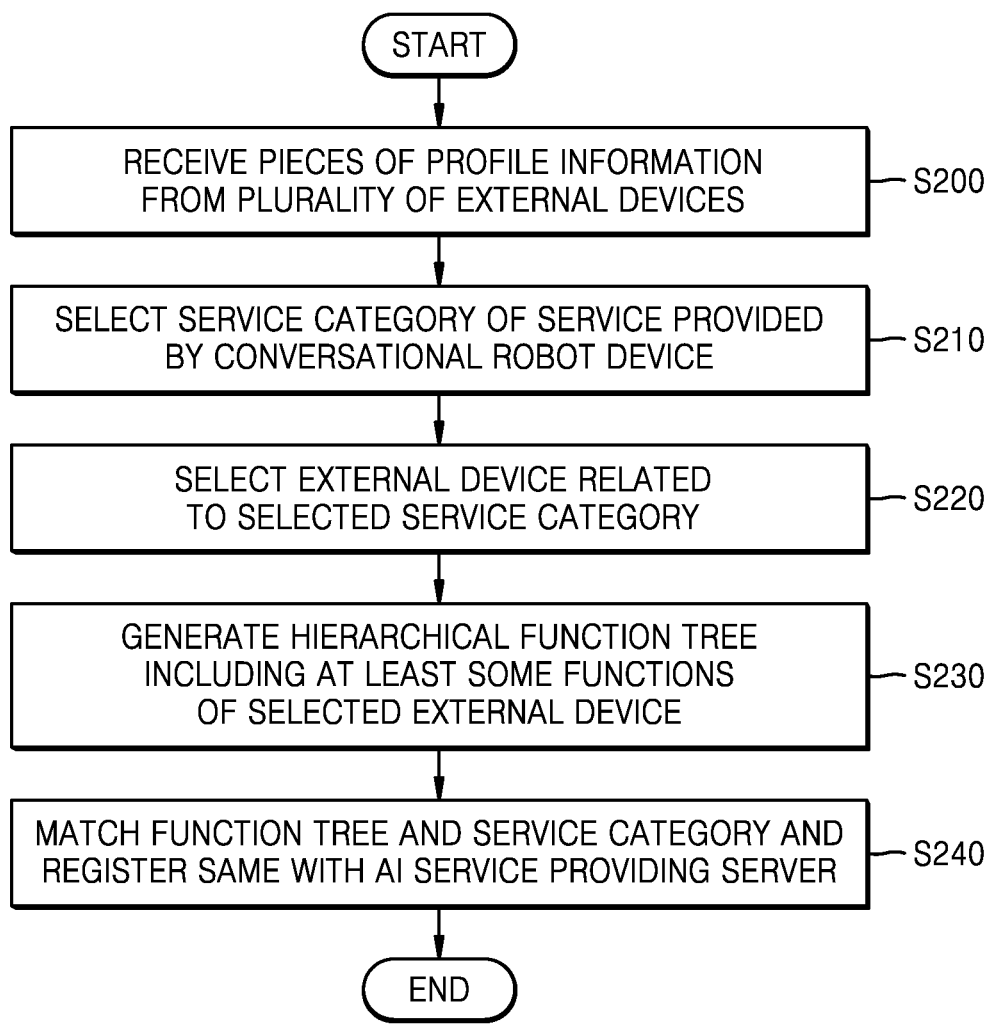
FIG. 2 is a flowchart illustrating an example method, performed by a conversational robot device, of registering an external device, according to various embodiments of the disclosure.

FIG. 2 is a flowchart illustrating an example method, performed by the conversational robot device 2000, of registering the external device 1000, according to various embodiments of the disclosure.

The conversational robot device 2000 may respectively receive pieces of profile information from a plurality of external devices 1000 (operation S200). The conversational robot device 2000 may, for example, establish short-range wireless communication with the external devices 1000 and respectively receive pieces of profile information from the external devices 1000 using the short-range wireless communication.

Profile information of each of the external devices 1000 may include information related to attributes and functions of each external device 1000. For example, the profile information may include, for example, and without limitation, information about a type and name of the external device 1000, a communication interface, a device authentication method, detailed functions of the external device 1000, or the like. The profile information may include, for example, data generated in a preset format that the conversational robot device 2000 can interpret and may be stored in a memory of the external device 1000 during manufacturing of the external device 1000. Accordingly, the conversational robot device 2000 may respectively identify the external devices 1000 that are of various types and conform with different standards using the pieces of profile information received from the external devices 1000.

The conversational robot device 2000 may receive an identifier of each external device 1000 from the external device 1000 and receive profile information indicating attributes and functions of the external device 1000 from the AI service providing server 4000 using the received identifier.

The conversational robot device 2000 may first register profile information of each of the external devices 1000 with the conversational robot device 2000 or the AI service providing server 4000.

The conversational robot device 2000 may select a service category of a service provided thereby (operation S210). The conversational robot device 2000 may select at least one of a plurality of service categories for the service provided thereby.

For example, the service may be a voice assistant service provided to the user via conversations with the user, and may include, for example, and without limitation, at least one of a broadcast service, a content sharing service, a content providing service, a device control service, a power management service, a game providing service, a chat service, a document writing service, a search service, a call service, a photo taking service, a transportation recommendation service, a video playback service, or the like, but is not limited thereto. Furthermore, the service categories may include categories related to the types or themes of the service provided by the conversational robot device 2000. For example, the service categories may include, but are not limited to, a newborn baby care service, an air purifying service, a heating service, a personal assistant service, a security service, or the like.

The conversational robot device 2000 may select an external device 1000 related to the selected service category from among the external devices 1000 (operation S220). The conversational robot device 2000 may select at least one external device 1000 related to the selected service category from among the external devices 1000 in order to provide AI services suitably for the user according to the selected service category. The external device 1000 corresponding to the service category may be preset, and the external device 1000 corresponding to the service category may be updated as a new service category and a new external device 1000 that is one of the external devices 1000 are registered.

The conversational robot device 2000 may generate a hierarchical function tree including at least some functions of the selected external device 1000 (operation S230). The conversational robot device 2000 may select, from among functions of the selected external device 1000, a function necessary to provide an AI service related to the selected service category. The conversational robot device 2000 may select functions necessary to provide an AI service related to the service category selected based on the profile information, and generate a function tree of the AI service related to the selected service category by hierarchically organizing the selected functions.

The function tree may include, for example, a command set for controlling the functions of the external device 1000 included in the function tree. Furthermore, the command set may include commands in a format supported by the external device 1000.

Furthermore, by taking an identification value of the service category and the pieces of profile information of the external devices 1000 as input to a predetermined AI model, the conversational robot device 2000 may obtain, from the AI model, a function tree including at least some functions of one or more external devices 1000 related to the service category. An AI model may, for example, be built taking into account, for example, an application field, the purpose of learning, computer performance of a device, or the like. For example, the AI model may be a model based on a neural network. For example, a model such as, for example, and without limitation, a deep neural network (DNN), a recurrent neural network (RNN), a bidirectional recurrent DNN (BRDNN), or the like, may be used as an AI model, but embodiments of the disclosure are not limited thereto.

A function tree of an AI service related to a service category will be described in greater detail below with reference to FIGS. 7, 8, 9 and 10.

The conversational robot device 2000 may match the function tree to the service category to register the function tree and the service category with the AI service providing server 4000 (operation S240). As the service category and the function tree are matched and registered, the conversational robot device 2000 may effectively determine one or more external devices 1000 to be controlled using the function tree when providing an AI service related to the service category at a later time and control functions of the one or more external devices 1000 at a time using a predetermined command set.

The registered function tree may be shared with other conversational robot devices (not shown), and another conversational robot device (not shown) using the same or similar external device 1000 as that used by the conversational robot device 2000 may provide an AI service more effectively using the registered function tree. For example, the registered function tree may be shared with other conversational robot devices (not shown) in a market form, but is not limited thereto.

The conversational robot device 2000 may generate a function tree of each user. The conversational robot device 2000 may generate a function tree of the external device 1000 taking into account a user's service usage history, and register the function tree of the external device 1000 for each user. The conversational robot device 2000 may also edit the function tree of the external device 1000 based on a user input.

Figure 3:
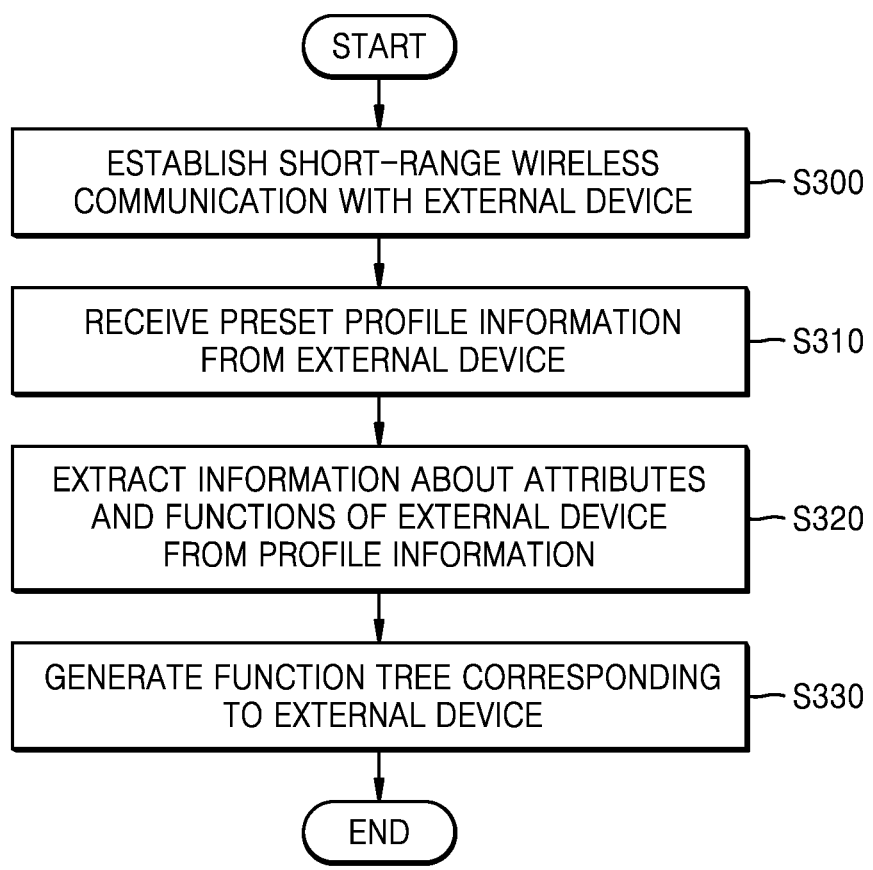
FIG. 3 is a flowchart illustrating an example method, performed by a conversational robot device, of generating a function tree, according to various embodiments of the disclosure.

FIG. 3 is a flowchart illustrating an example method, performed by the conversational robot device 2000, of generating a function tree, according to various embodiments of the disclosure.

The conversational robot device 2000 may establish a short-range wireless communication with the external device 1000 (operation S300). For example, the conversational robot device 2000 may establish a short-range wireless communication with the external device 1000 using Wi-Fi, BLE, Zigbee, NFC, or the like, but is not limited thereto.

The conversational robot device 2000 may receive preset profile information from the external device 1000 (operation S310). For example, when the conversational robot device 2000 initially establishes communication with the external device 1000, the conversational robot device 2000 may request profile information from the external device 1000 and receive the profile information of the external device 1000 from the external device 1000. The profile information may be data generated in preset language and format that the conversational robot device can interpret, and may be stored in the memory of the external device 1000 during manufacturing by a manufacturer of the external device 1000. For example, the profile information may include information about a type and name of the external device 1000, a communication interface, a device authentication method, and detailed functions of the external device 1000.

The conversational robot device 2000 may receive an identifier of the external device 1000 from the external device 1000 and receive profile information indicating attributes and functions of the external device 1000 from the AI service providing server 4000 using the received identifier. The conversational robot device 2000 may search for information necessary for generating the profile information of the external device 1000 using the identifier of the external device 1000.

The conversational robot device 2000 may primarily register the profile information of the external device 1000 with the conversational robot device 2000 or the AI service providing server 4000, regardless of a service category of an AI service.

The conversational robot device 2000 may extract information about attributes and functions of the external device 1000 from the profile information (operation S320). For example, the conversational robot device 2000 may extract information about the type of the external device 1000, higher- and lower-level functions of the external device 1000, etc., from the profile information.

The conversational robot device 2000 may generate a function tree corresponding to the external device 1000 (operation S330). The conversational robot device 2000 may select some of the functions of the external device 1000 and generate a function tree of the external device by organizing the selected some of the functions in a hierarchical manner. The conversational robot device 2000 may generate a function tree of the external device 1000 by variously classifying functions of the external device 1000 into upper- and lower-level functions.

The function tree of the external device 1000 may include, for example, a command set for controlling the functions of the external device 1000 in the function tree. Furthermore, the command set may include commands in a format supported by the external device 1000.

The conversational robot device 2000 may generate a function tree of the external device 1000 for each service category of the AI service. The conversational robot device 2000 may generate a plurality of function trees for one service category by differently organizing the functions of the external device 1000. Furthermore, the conversational robot device 2000 may generate a function tree of the external device 1000 regardless of a service category of the AI service.

Figure 4:
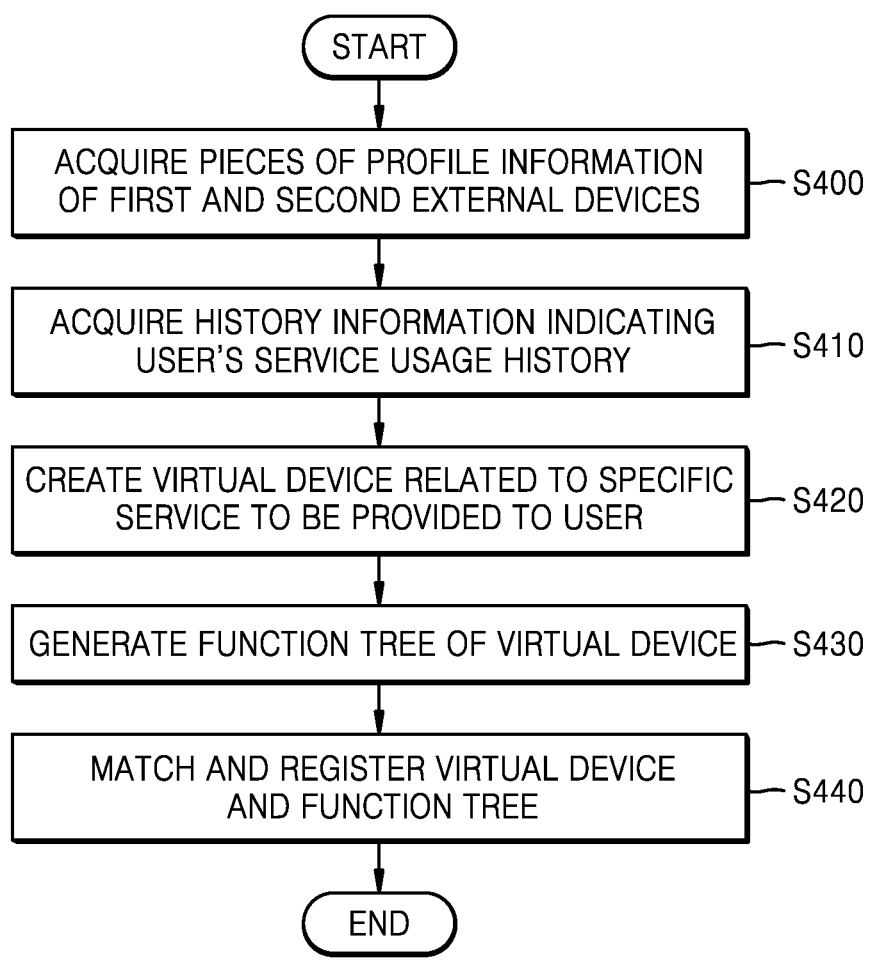
FIG. 4 is a flowchart illustrating an example method, performed by a conversational robot device, of creating a virtual device, according to various embodiments of the disclosure.

FIG. 4 is a flowchart illustrating an example method, performed by the conversational robot device 2000, of generating a virtual device, according to various embodiments of the disclosure. The conversational robot device 2000 may, for example, create a virtual device by dividing the plurality of external devices 1000 into groups and generate a function tree of the virtual device.

The conversational robot device 2000 may acquire profile information of a first external device and profile information of a second external device (operation S400).

The conversational robot device 2000 may acquire history information indicating a user's service usage history (operation S410). The history information indicating the user's service usage history may be information about which service category of a service was used by the user and how the service was used by the user. For example, the history information may include a service category of a service used by the user, a type and functions of the external device 1000 controlled via the service used by the user, information about circumstances under which the external device 1000 is controlled, etc.

The information about the circumstances under which the external device 1000 is controlled may include at least one of information about an environment surrounding the conversational robot device 2000, status information of a device, state information of a user, information about a user's device usage history, or schedule information of the user, but is not limited thereto.

The information about the environment surrounding the conversational robot device 2000 refers to information about an environment within a predetermined radius away from the conversational robot device 2000, and may include, for example, weather information, temperature information, humidity information, illuminance information, noise information, sound information, etc., but is not limited thereto.

The status information of the device may include mode information of the device (e.g., sound mode, vibration mode, silent mode, power saving mode, prevention mode, multi-window mode, auto rotation mode, etc.), location information of the device, time information, activation information of a communication module (Wi-Fi ON/Bluetooth OFF/GPS ON/NFC ON, etc.), network connection status information of the device, information about an application executed in a device (e.g., application identification information, application type, application usage time, and application usage period), etc., but is not limited thereto. The device may include the external device 1000, the conversational robot device 2000, and the mobile device 3000.

The state information of the user may, for example, include information about a user's movement, lifestyle, etc., and may include information about a user's walking state, exercise state, driving state, sleep state, mood state, etc., but is not limited thereto. The information about the user's device usage history is information about a history of a user's device usage, and may include an application execution history, a history of functions executed in the application, a user's call history and text history, etc., but is not limited thereto.

The conversational robot device 2000 may create a virtual device related to a specific service to be provided to the user (operation S420). The conversational robot device 2000 may select at least some of the functions of the first external device and at least some of the functions of the second external device and create the virtual device for providing the selected functions. For example, by combining some functions of an air conditioner with some functions of a robot vacuum cleaner, the conversational robot device 2000 may create, as the virtual device, a virtual air control device for providing some functions of the air conditioner together with some functions of the robot vacuum cleaner.

The conversational robot device 2000 may create a virtual device in association with a specific service category. When providing an AI service under the specific service category to the user, the conversational robot device 2000 may create a virtual device to allow the user to conveniently control the external device 1000. The conversational robot device 200 may use information about a user's service history to create the virtual device related to the specific service category.

The conversational robot device 2000 may generate a function tree of the virtual device (operation S430). The conversational robot device 2000 may select at least some of the functions of the virtual device and generate a function tree of the virtual device by organizing the selected some of the functions in a hierarchical manner. The conversational robot device 2000 may generate a plurality of function trees of the virtual device by variously classifying the functions of the virtual device into upper- and lower-level functions.

The conversational robot device 2000 may generate a function tree of the virtual device for each service category of an AI service. The conversational robot device 2000 may generate a plurality of function trees for one service category by differently organizing the functions of the virtual device. Furthermore, the conversational robot device 2000 may generate a function tree of the virtual device regardless of a service category of the AI service.

In addition, the conversational robot device 2000 may generate a virtual device and a function tree of the virtual device using a predetermined AI model. For example, by taking pieces of profile information of the external devices 1000, an identification value of a service category, and information about a user's service history as input to a predetermined AI model, the conversational robot device 2000 may obtain a virtual device related to the service category and a function tree of the virtual device from the predetermined AI model. An AI model may be built taking into account an application field, the purpose of learning, computer performance of a device, or the like. For example, the AI model may be a model based on a neural network. For example, a model such as, for example, and without limitation, a DNN, a RNN, a BRDNN, or the like, may be used as an AI model, but embodiments of the disclosure are not limited thereto.

The conversational robot device 2000 may generate a function tree of a virtual device for each user. The conversational robot device 2000 may generate a function tree of the virtual device taking into account a user's service usage history, and register the generated function tree of the virtual device for each user. The conversational robot device 2000 may also edit the function tree of the virtual device based on a user input.

The function tree of the virtual device may include a command set for controlling the functions of the first and second external devices in the function tree. Furthermore, the command set may include commands in formats respectively supported by the first and second external devices.

The conversational robot device 2000 may match and register the virtual device and the function tree of the virtual device (operation S440). The conversational robot device 2000 may match and register a service category, a virtual device, and a function tree of the virtual device. As the service category, the virtual device, and the function tree of the virtual device are matched and registered, the conversational robot device 2000 may determine a target to be controlled as the virtual device when providing an AI service related to the service category at a later time and control functions of the virtual device at a time using a predetermined command set related to the function tree of the virtual device.

The registered function tree of the virtual device may be shared with other conversational robot devices (not shown), and another conversational robot device (not shown) using the same or similar external device 1000 as that for the conversational robot device 2000 may provide an AI service more effectively using the registered function tree. For example, the registered function tree of the virtual device may be shared with other conversational robot devices (not shown) in a market form, but is not limited thereto.

Figure 5:
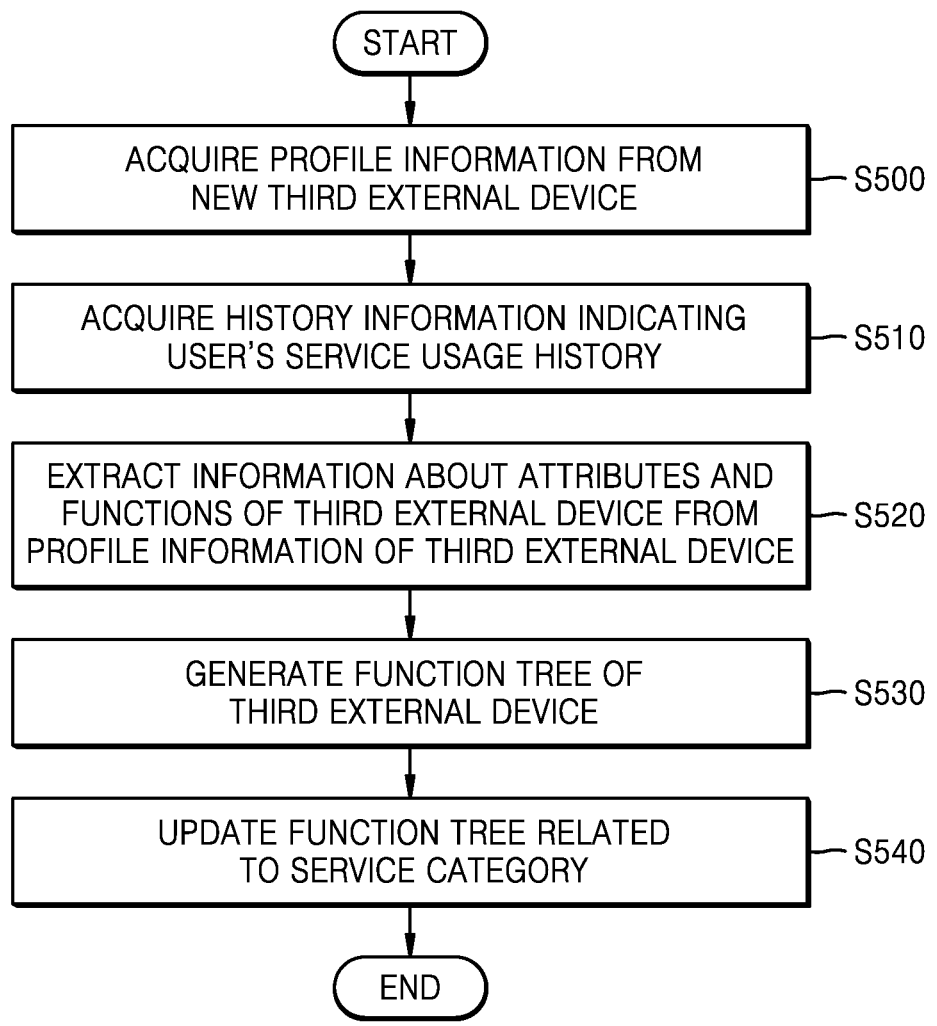
FIG. 5 is a flowchart illustrating an example method, performed by a conversational robot device, of updating a function tree, according to various embodiments of the disclosure.

FIG. 5 is a flowchart illustrating an example method, performed by the conversational robot device 200, of updating a function tree, according to various embodiments of the disclosure.

The conversational robot device 2000 may acquire profile information from a new third external device (operation S500). As the third external device 1000-3 is located within a communication range of the conversational robot device 2000, the conversational robot device 2000 may receive profile information from the third external device.

The conversational robot device 2000 may acquire information about a user's service usage history (operation S510). The conversational robot device 2000 may acquire history information indicating a history of a user's service usage using a function tree of the external device 1000. The history information indicating the user's service usage history may be information about which service category of a service is used by the user and how the service was used by the user. For example, the history information may include a service category of a service used by the user, a type and functions of the external device 1000 controlled via the service used by the user, information about circumstances under which the external device 1000 is controlled, etc.

The conversational robot device 2000 may extract information about attributes and functions of the third external device from the profile information of the third external device (operation S520). For example, the conversational robot device 2000 may extract, from the profile information, information about the type of the third external device, higher- and lower-level functions of the third external device.

The conversational robot device 2000 may generate a function tree of the third external device (operation S530). The conversational robot device 2000 may select some of the functions of the third external device and generate a function tree of the third external device by organizing the selected some of the functions in a hierarchical manner. The conversational robot device 2000 may generate a function tree of the third external device by variously classifying the functions of the third external device into upper- and lower-level functions.

The conversational robot device 2000 may generate a function tree of the third external device for each service category of an AI service. The conversational robot device 2000 may generate a plurality of function trees for one service category by differently organizing the functions of the third external device. The conversational robot device 2000 may generate a function tree of the third external device regardless of a service category of the AI service.

The conversational robot device 2000 may update a function tree related to a service category (operation S540). As the third external device is registered, the conversational robot device 2000 may generate a virtual device corresponding to a first service category. The conversational robot device 2000 may generate the function tree of the virtual device corresponding to the first service category. By combining at least some of the functions of the third external device with at least some functions of another external device, the conversational robot device 2000 may generate the function tree of the virtual device corresponding to the first service category.

As the third external device is registered, the conversational robot device 2000 may update a function tree of a virtual device corresponding to a second service category. By combining at least some of the functions of the third external device with the function tree of the virtual device corresponding to the second service category, the conversational robot device 2000 may update the function tree of the virtual device corresponding to the second service category. By recombining the functions of the virtual device corresponding to the second service category and the functions of the third external device, the conversational robot device 2000 may update the function tree of the virtual device corresponding to the second service category.

FIG. 6 is a diagram illustrating an example of profile information of the external device 1000 according to various embodiments of the disclosure Referring to FIG. 6, the profile information of the external device 1000 may include, for example, and without limitation, information about a device type, a device name, a device control, device attributes, device functions, or the like. For example, information about device control may include information about a communication interface, a protocol used for each hardware interface, a control channel (e.g., a protocol and a port number) via which commands are transmitted and received, a device authentication method, etc. For example, the profile information of the external device 1000 may include information about a tree of functions provided by the external device 1000. In addition, the functions provided by the external device 1 may be classified into functions related to a specific service category and functions not related to the specific service category.

FIG. 7 is a diagram illustrating an example of a function tree of the external device 1000, corresponding to a specific service category, according to various embodiments of the disclosure.

Referring to FIG. 7, a function tree of a robot vacuum cleaner that is one of the external devices 1000 may be generated for a cleaning service category. For example, functions of the robot vacuum cleaner may include an air conditioner function, an air purifying function, and a floor cleaning function. Furthermore, the air conditioner function may include a temperature control function and a humidity control function, and the air purifying function may include a dust sensing function. In addition, the floor cleaning function may include a trash sucking function and a damp mopping function.

The conversational robot device 2000 may select, from among functions of the external device 1000, the air purifying function, the floor cleaning function, the dust sensing function, the trash sucking function, and the damp mopping function. Furthermore, the conversational robot device 2000 may generate a function tree of the robot vacuum cleaner, corresponding to the cleaning service, by organizing the selected functions in a hierarchical manner.

The conversational robot device 2000 may generate the function tree of the robot vacuum cleaner as shown in FIG. 7 taking into account, for example, and without limitation, a service usage history of a user, a service usage history of another user, an identification value of a service category, profile information of the robot vacuum cleaner, a preregistered function tree corresponding to the service category, or the like. Furthermore, the conversational robot device 2000 may generate a function tree using a predetermined AI model. For example, the conversational robot device 2000 may obtain the function tree of the robot vacuum cleaner by inputting to the AI model a service usage history of a user, a service usage history of another user, an identification value of a service category, profile information of the robot vacuum cleaner, a preregistered function tree corresponding to the service category, or the like.

A function tree of the external device 1000 may include a plurality of command sets for controlling the functions of the external device 1000 included in the function tree. A command set may include, for example, a set of commands for controlling the functions of the external device 1000 with respect to a specific event under a specific service category. For example, to remove dust from the floor during the cleaning service, a command set may be generated to activate the air purifying function of the robot vacuum cleaner, activate the floor cleaning function thereof while sensing the dust, and execute the damp mopping function. As another example, to remove trash from the floor during the cleaning service, a command set may be generated to deactivate the air purifying function of the robot vacuum cleaner, activate the floor cleaning function thereof, and activate the trash sucking function. A command set may include information regarding an event for which the command set is to be executed.

Furthermore, the command sets for controlling the functions of the external device 1000 included in the function tree may be stored separately from the function tree. The command sets for controlling the functions of the external device 1000 included in the function tree may be matched to the function tree for storage. A command set may be provided to the AI service providing server 4000 using an API provided by the AI service providing server 4000, and the command set provided to the AI service providing server 4000 may be stored in a predetermined database (DB) of the AI service providing server 4000.

FIG. 8 is a diagram illustrating an example of a function tree of a virtual device generated based on functions of the external devices 1000, according to various embodiments of the disclosure.

Referring to FIG. 8, a function tree of a virtual air control device that is a virtual device may be generated for an air care service category. For example, functions of an air conditioner may include an air conditioning function and an air purifying function, the air conditioning function may include a temperature control function and a humidity control function, and the air purifying function may include an odor sensing function and a dust sensing function. Furthermore, for example, functions of the robot vacuum cleaner may include an air purifying function and a floor cleaning function, and the air purifying function may include a dust sensing function, and the floor cleaning function may include a trash sucking function and a damp mopping function.

The conversational robot device 2000 may select the air purifying function, the odor sensing function, and the dust sensing function from among the functions of the air conditioner, and select the air purifying function and the dust sensing function from among the functions of the robot vacuum cleaner. The conversational robot device 2000 may define functions of a virtual air control device by combining the selected functions together. The conversational robot device 2000 may generate a function tree of the virtual air control device, corresponding to the air care service category, by organizing the selected functions in a hierarchical manner. For example, the conversational robot device 2000 may process Register/Control/Monitor (data saving)/Auto-Execution (event processing)/Control by providing a script-based code block. Furthermore, the conversational robot device 2000 may generate profile information of a virtual device, e. g., by integrating pieces of profile information of the external devices 1000. In addition, the conversational robot device 2000 may determine functions of the external devices 1000 to be included in the virtual device based on positions of installation and operation of the external devices 1000.

Figure 9:
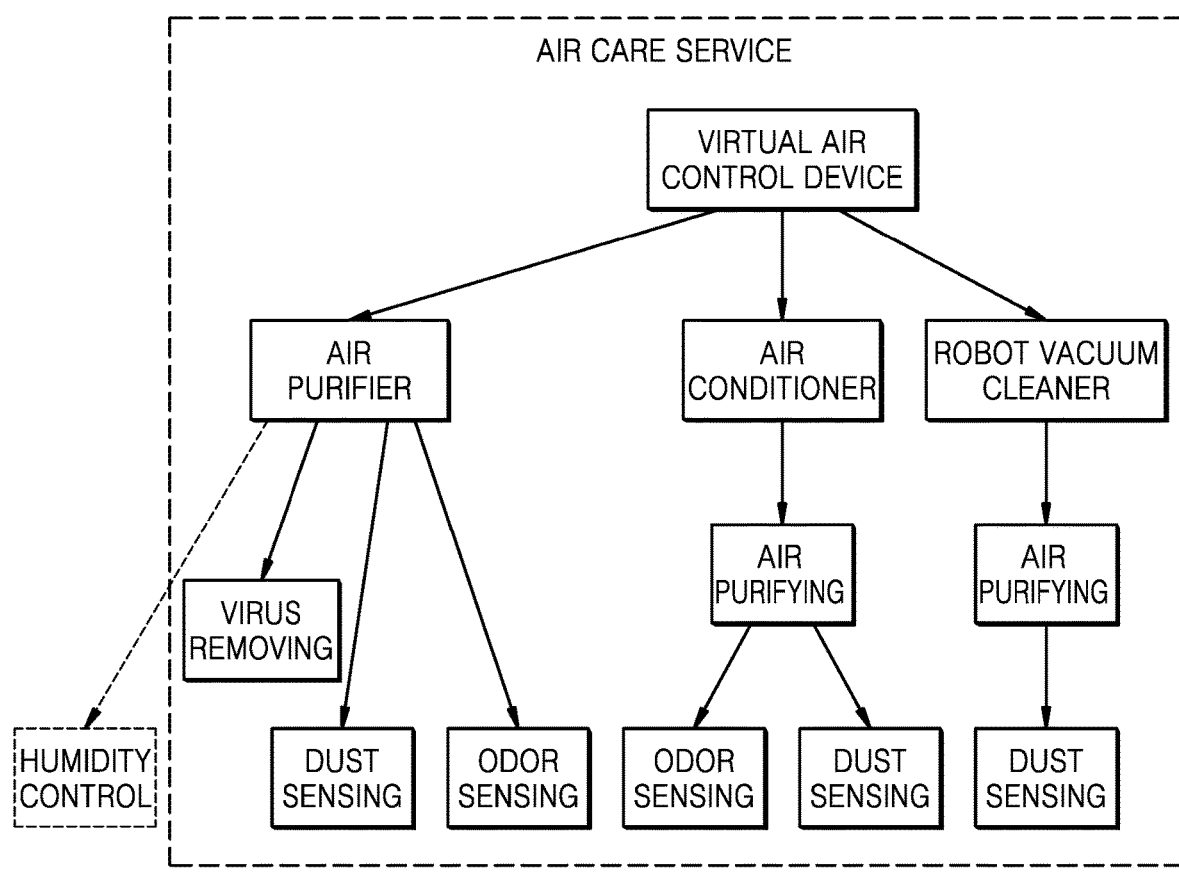
FIG. 9 is a diagram illustrating an example in which a function tree is updated, according to various embodiments of the disclosure.

FIG. 9 is a diagram illustrating an example in which a function tree is updated, according to various embodiments of the disclosure.

Referring to FIG. 9, as a new air purifier is registered, the conversational robot device 2000 may update the function tree shown in FIG. 8. For example, functions of the new air purifier may include, by way of example, a humidity control function, a virus removing function, a dust sensing function, and an odor sensing function. The conversational robot device 2000 may select the virus removing function, the dust sensing function, and the odor sensing function from among the functions of the air purifier, and include the selected functions in the functions of the virtual air control device. In addition, the conversational robot device 2000 may update the function tree of the virtual air control device by hierarchically organizing the selected functions. The conversational robot device 2000 may generate a plurality of command sets by selecting some of the functions in the updated function tree.

FIG. 10 is a diagram illustrating an example of data included in a function tree, according to various embodiments of the disclosure.

Referring to FIG. 10, a function tree may include, for example, a list of functions included in the function tree, a relationship between upper- and lower-level functions, an input value and an output operation for a specific operation, an event related to an operation corresponding to a specific function, and information regarding a function control related to the event, or the like. Furthermore, the function tree may include, for example, information about a type, name, descriptor, tag, parent, get, set, monitor, event, control, and attribute list, or the like. In addition, the function tree may include information about responses to commands such as get/set/monitor/event/control for controlling a function in the function tree.

Figure 11:
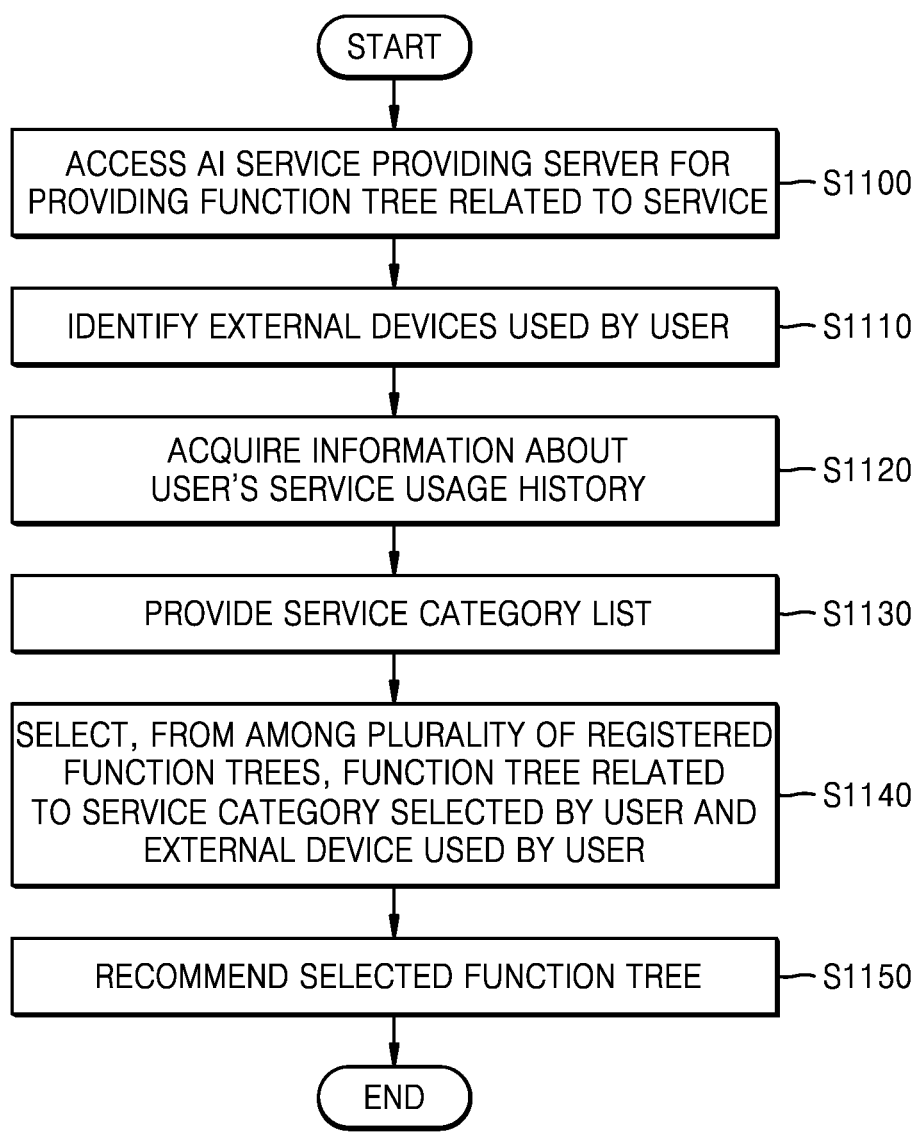
FIG. 11 is a flowchart illustrating an example method of sharing a function tree of an external device, according to various embodiments of the disclosure.

FIG. 11 is a flowchart illustrating an example method of sharing a function tree of an external device, according to various embodiments of the disclosure.

A user may access the AI service providing server 4000 that provides a function tree related to a service (operation S1100). The user may access the AI service providing server 4000 via the conversational robot device 2000 or the mobile device 3000. The mobile device 3000 may control the conversational robot device 2000 and perform an operation for settings related to the conversational robot device 2000.

The AI service providing server 4000 may identify the external devices 1000 used by the user (operation S1110). The AI service providing server 4000 may receive information about the external device 1000 used by the user from the conversational robot device 2000 or the mobile device 3000. For example, the AI service providing server 4000 may receive a type, a model name, profile information, etc. of the external device 1000 used by the user.

The AI service providing server 4000 may acquire information about a user's service usage history (operation S1120). The information about the user's service usage history may include, for example, information indicating which service category of a service was used by the user, under what circumstances the service was used by the user, and how the service was used by the user, etc. For example, the information about the user's service usage history may include a service category of a service used by the user, a type and functions of the external device 1000 controlled via the service used by the user, information about circumstances under which the external device 1000 is controlled, etc.

The AI service providing server 4000 may provide a list of service categories to the user (operation S1130). The AI service providing server 4000 may provide a list of service categories to the user in order to determine how to control the external device 1000 in relation to a specific service category. The user may receive the list of service categories via the conversational robot device 2000 or the mobile device 3000 and select a specific service category from the list of service categories. Furthermore, the user may request the AI service providing server 4000 to create a new service category, and the AI service providing server 4000 may create a new service category in response to the user's request.

The AI service providing server 400 may select, from among a plurality of registered function trees, a function tree related to a service category selected by the user and the external device 1000 used by the user (operation S1140). For example, the AI service providing server 4000 may select function trees including the same device as the external device 1000 used by the user, from among the registered function trees corresponding to the service category selected by the user. The AI service providing server 4000 may select, based on the user's service usage history, function trees that are expected to be preferred by the user.

The AI service providing server 4000 may recommend the selected function trees (operation S1150). The AI service providing server 4000 may provide a list of the selected function trees to the user, and the user may receive the list of selected function trees via the conversational robot device 2000 or the mobile device 3000. The user may select a specific function tree from the list of function trees and edit the selected function tree.

Figure 12:
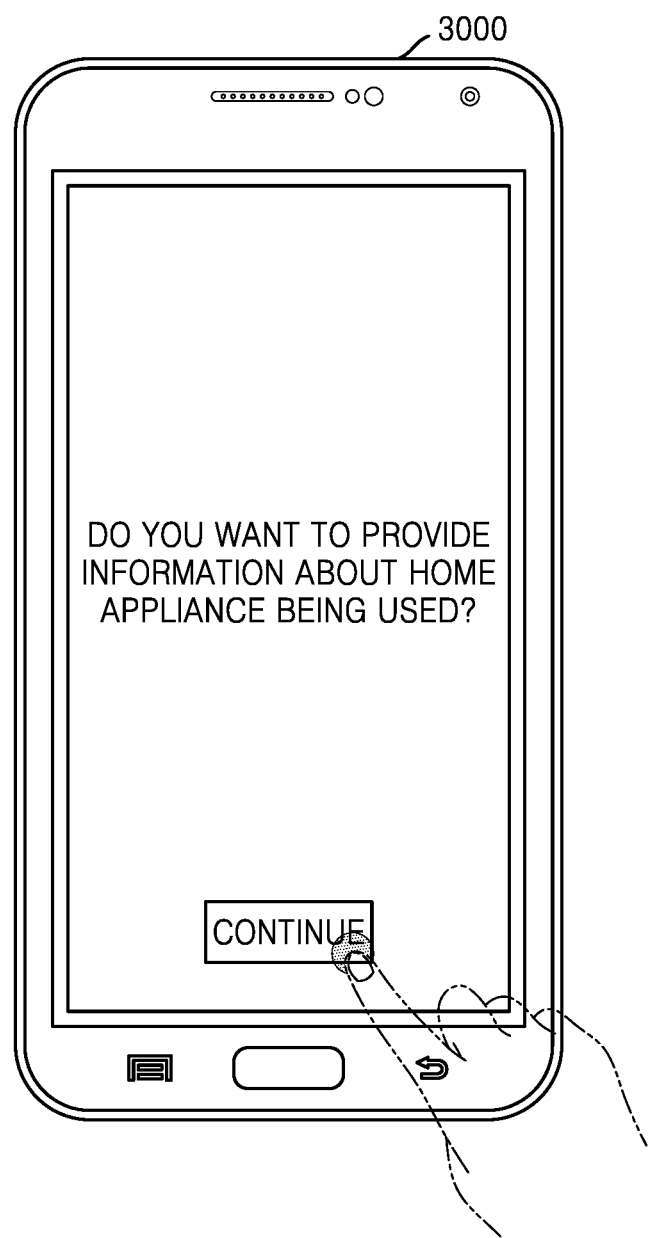
FIG. 12 is a diagram illustrating an example in which a user selects and edits a function tree related to a service category via a mobile device, according to various embodiments of the disclosure.
Figure 13:
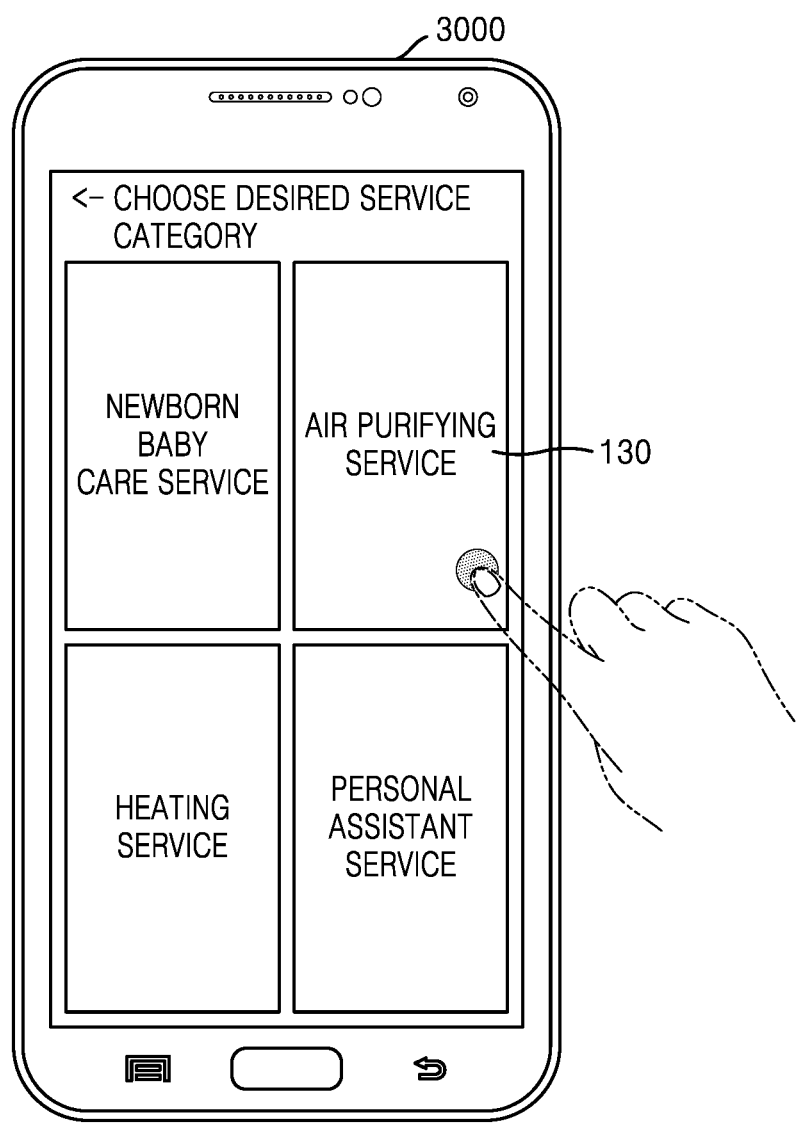
FIG. 13 is a diagram illustrating an example in which a user selects and edits a function tree related to a service category via a mobile device, according to various embodiments of the disclosure.
Figure 14:
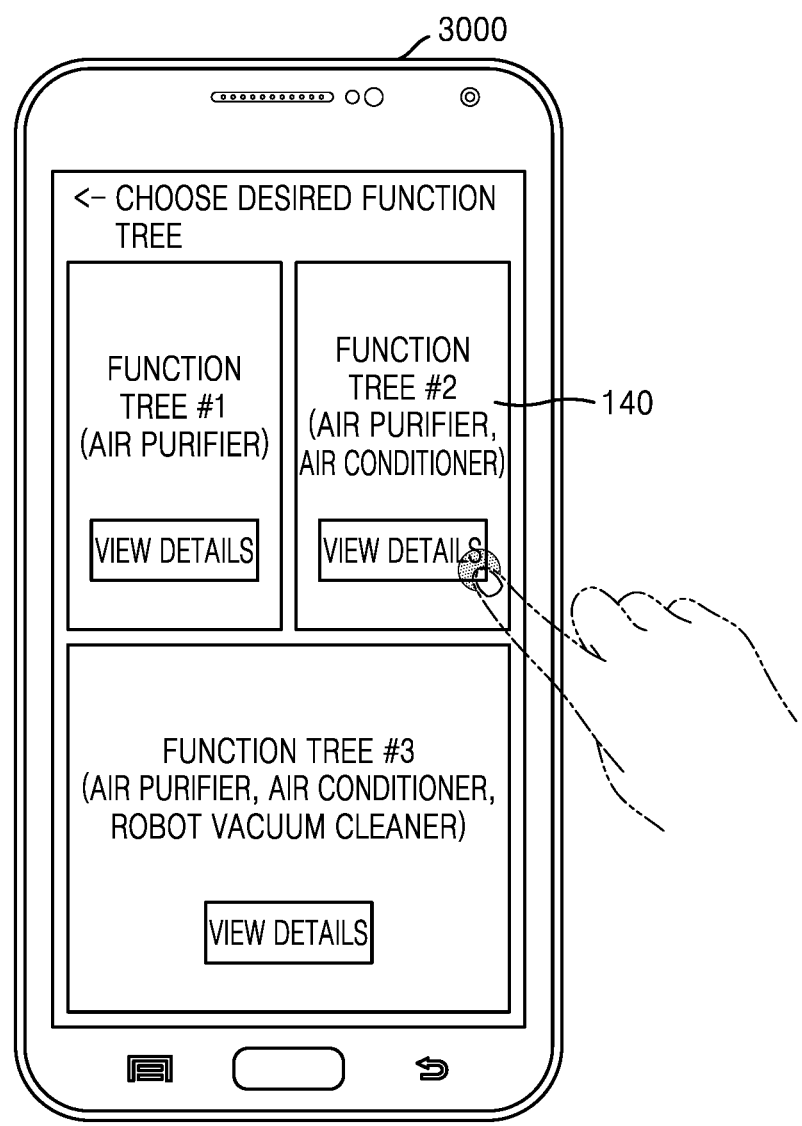
FIG. 14 is a diagram illustrating an example in which a user selects and edits a function tree related to a service category via a mobile device, according to various embodiments of the disclosure.
Figure 15:
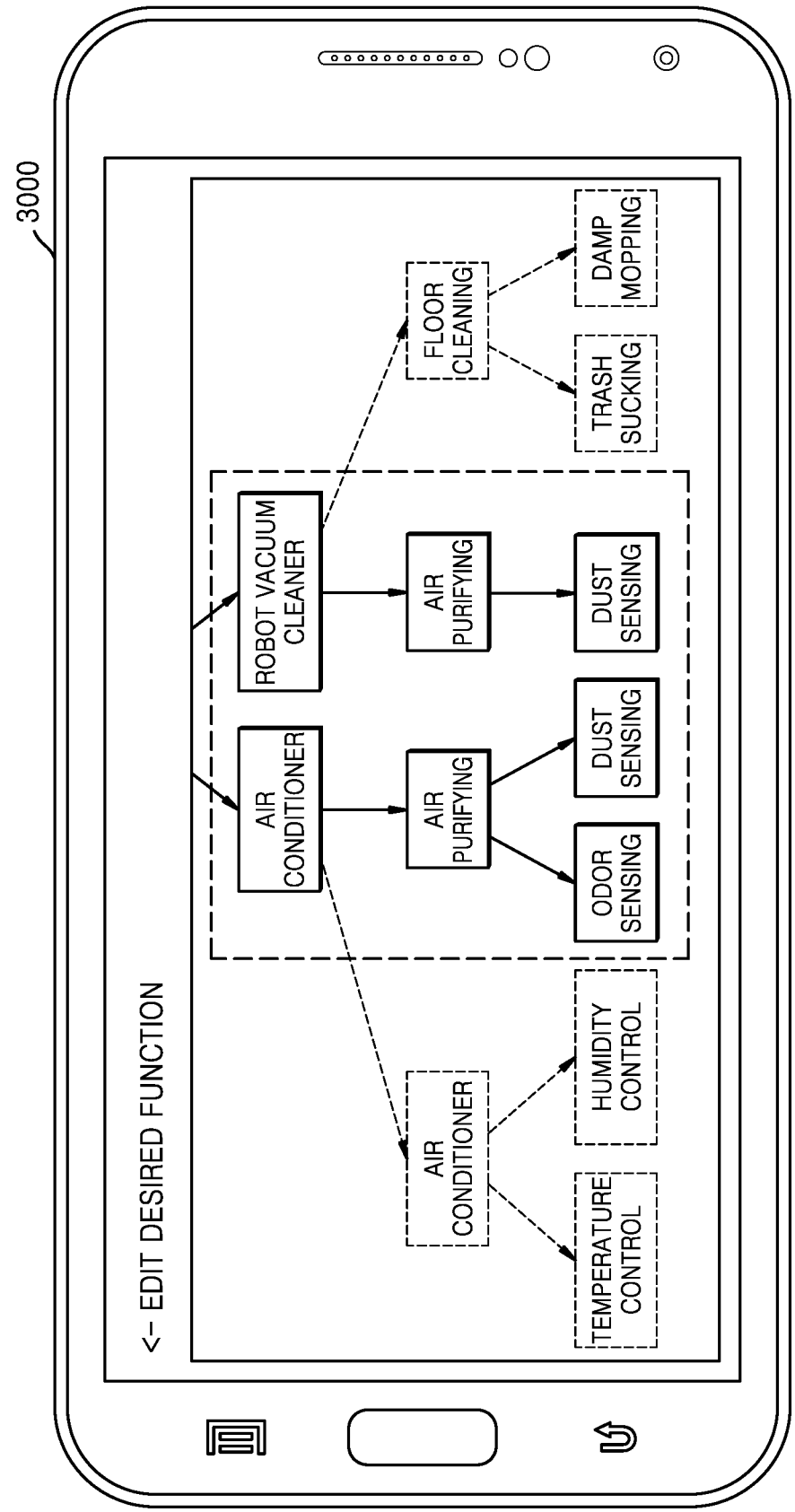
FIG. 15 is a diagram illustrating an example in which a user selects and edits a function tree related to a service category via a mobile device, according to various embodiments of the disclosure.

FIG. 12 is a diagram illustrating an example in which a user selects and edits a function tree related to a service category via the mobile device 3000, according to various embodiments of the disclosure, FIG. 13 is a diagram illustrating an example in which a user selects and edits a function tree related to a service category via a mobile device, according to various embodiments of the disclosure, FIG. 14 is a diagram illustrating an example in which a user selects and edits a function tree related to a service category via a mobile device, according to various embodiments of the disclosure, and FIG. 15 is a diagram illustrating an example in which a user selects and edits a function tree related to a service category via a mobile device, according to various embodiments of the disclosure.

Referring to FIG. 12, the mobile device 3000 may output a message for checking whether to provide the AI service providing server 4000 with information about the external device 1000 being used by the user. Furthermore, the mobile device 3000 may provide, based on a user input, the AI service providing server 4000 with profile information of the external device being used by the user.

Referring to FIG. 13, the mobile device 3000 may display a GUI for selecting a service category of an AI service. The mobile device 3000 may receive a service category list from the AI service providing server 4000 and display the received service category list. The AI service providing server 4000 may recommend a service category list to the user based on the external device 1000 being used by the user and a user's service usage history. For example, the mobile device 3000 may display a newborn baby care service, an air purifying service, a heating service, and a personal assistant service, and receive a user input of selecting an area 130 where the air purifying service is displayed.

Referring to FIG. 14, the mobile device 3000 may display a GUI for selecting a function tree corresponding to the selected service category. The mobile device 3000 may receive a function tree list from the AI service providing server 4000 and display the received function tree list. The AI service providing server 4000 may determine, based on the external device 1000 being used by the user and the user's service usage history, a function tree to be recommended to the user from among function trees matched to the service category selected by the user. For example, the mobile device 3000 may recommend to the user function trees #1, #2 and #3 from among function trees corresponding to the air purifying service. Furthermore, the mobile device 3000 may receive a user input of selecting a button 140 for viewing detailed functions in the function tree #2.

Referring to FIG. 15, the mobile device 3000 may display a GUI showing the detailed functions in the function tree #2. The mobile device 3000 may display identification values and functions of the external devices 1000 included in the function tree #2 in a hierarchical manner. The mobile device 3000 may also receive a user input of editing the function tree #2. The mobile device 3000 may receive a user input for adding or deleting the external devices 1000 and their functions included in the function tree #2. Furthermore, the mobile device 3000 may display a GUI (not shown) for editing a command set related to the function tree #2.

While it has been described with reference to FIGS. 12, 13, 14 and 15 that the mobile device 3000 selects a desired service category and a desired function tree and edits the function tree, embodiments of the disclosure are not limited thereto. When the conversational robot device 2000 provides an input/output function including a function of a display, the conversational robot device 2000 may perform the operations described with reference to FIGS. 12 through 15.

Figure 16:
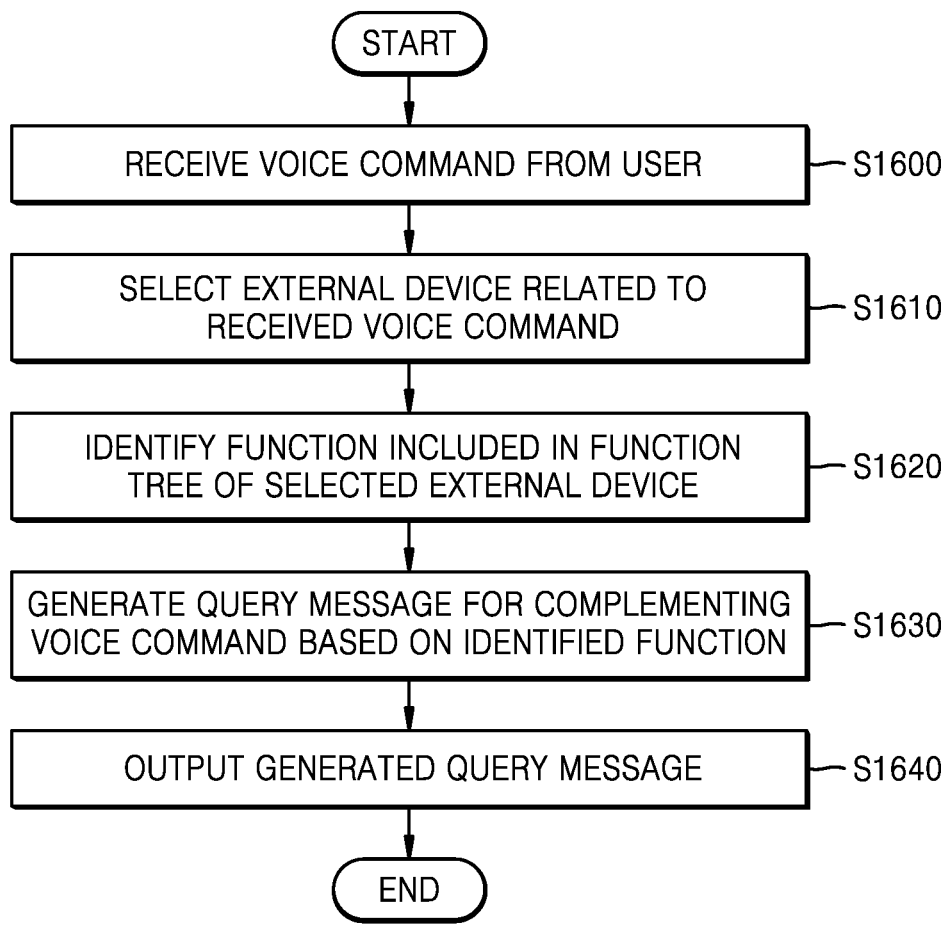
FIG. 16 is a flowchart illustrating an example method in which a conversational robot device complements a user's voice command, according to various embodiments of the disclosure.

FIG. 16 is a flowchart illustrating an example in which a conversational robot device complements a user's voice command, according to various embodiments of the disclosure.

The conversational robot device 2000 may receive a voice command from the user (operation S1600).

The conversational robot device 2000 may select the external device 1000 related to the received voice command (operation S1610). The conversational robot device 2000 may interpret the received voice command and select the external device 1000 related to the user's voice command based on a result of the interpreting. The conversational robot device 2000 may identify a service category related to the user's voice command, based on the meaning of the received voice command and a word included in the received voice command. The conversational robot device 2000 may select the external device 1000 related to the received voice command from among the external devices 1000 corresponding to the identified service category. The conversational robot device 2000 may select the external device 1000 based on profile information of the preregistered external device 1000 and function information and event information included in a pre-generated function tree. The conversational robot device 2000 may select the external device 1000 related to the user's voice command by inputting the user's voice command or words in the user's voice command to a predetermined AI model.

The conversational robot device 2000 may provide the AI service providing server 4000 with a text generated by converting the user's voice command and receive an identification value of the external device 1000 selected by the AI service providing server 4000 from the AI service providing server 4000.

The conversational robot device 2000 may identify a function included in a function tree of the selected external device 1000 (operation S1620). The conversational robot device 2000 may identify a function related to the user's voice command, from among functions included in the function tree of the selected external device 1000.

The conversational robot device 2000 may generate, based on the identified function, a query message for complementing the voice command (operation S1630). The conversational robot device 2000 may identify information not included in the voice command from among pieces of information necessary for executing the identified function. The conversational robot device 2000 may estimate command sets suitable for the user's voice command taking into account a situation in which the user utters the voice command, a user's service usage history, and a service category of a service desired by the user. The conversational robot device 2000 may generate a query message for complementing the user's voice command in order to request the user for information necessary to select one command set from among the estimated command sets. The conversational robot device 2000 may generate a query message for requesting the user for information that is not included in the user's voice command from among pieces of information necessary to select one of the estimated command sets. The conversational robot device 2000 may generate a query message for complementing the user's voice command by inputting the user's service usage history and the user's voice command or words included in the voice command to a predetermined AI model.

The conversational robot device 2000 may provide the AI service providing server 4000 with the user's voice command or words in the voice command and receive a query message generated by the AI service providing server 4000 from the AI service providing server 4000.

The conversational robot device 2000 may output the generated query message (operation S1640). The conversational robot device 2000 may repeatedly generate and output the query message.

Figure 17:
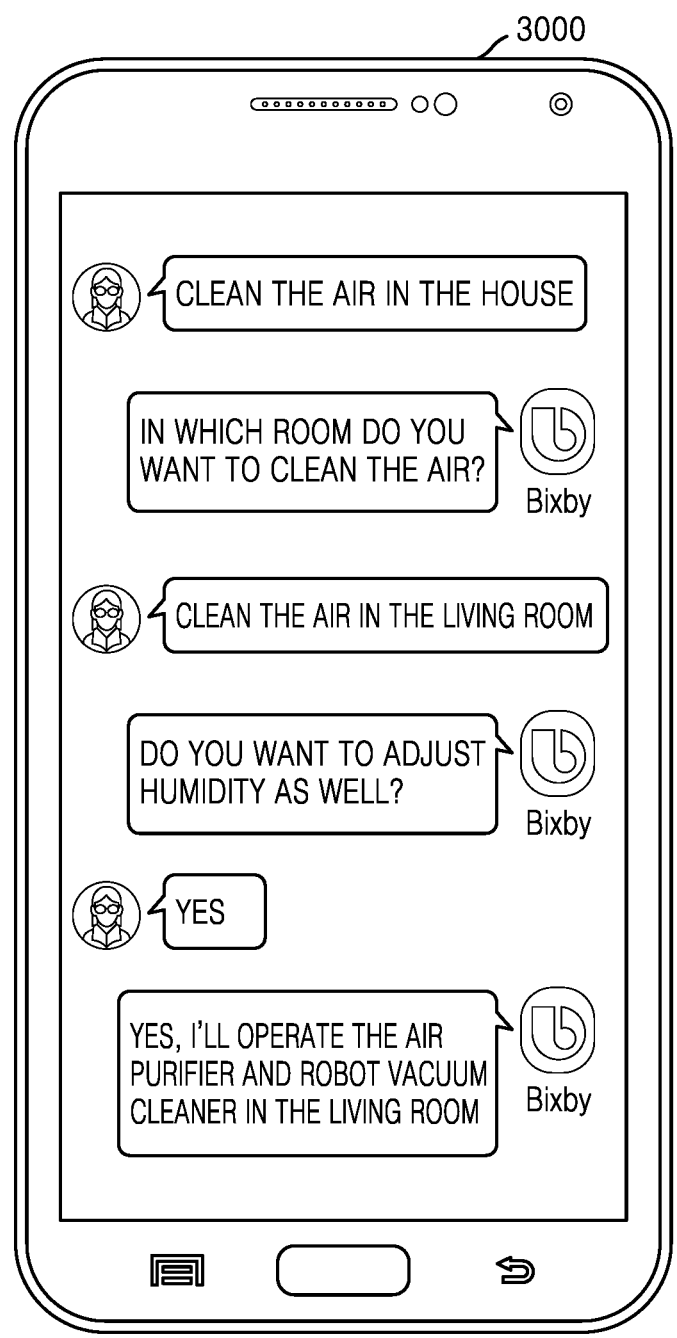
FIG. 17 is a diagram illustrating an example of a user's voice input and a query message, according to various embodiments of the disclosure.

FIG. 17 is a diagram illustrating an example of a user's voice input and a query message, according to various embodiments of the disclosure.

Referring to FIG. 17, the conversational robot device 2000 may be provided via the mobile device 3000. Furthermore, a conversation window indicating a user's voice input and an output of a query message may be displayed on a screen of the mobile device 3000. For example, the mobile device 3000 may receive a user's voice input saying "Clean the air in the house", and output a query message "In which room do you want to clean the air?". The mobile device 300 may receive a user's response via a voice saying "Clean the air in the living room", and additionally output a query message "Do you want to adjust humidity as well?". The mobile device 3000 may receive a user's response via a voice "Yes" and output a response message "Yes, I'll operate the air purifier and robot vacuum cleaner in the living room". In addition, the mobile device 3000 may obtain a command set related to a function tree and for controlling functions of the air purifier and the robot vacuum cleaner in relation to a service for cleaning the air in the living room and control the air purifier and the robot vacuum cleaner using the obtained command set.

Figure 18:
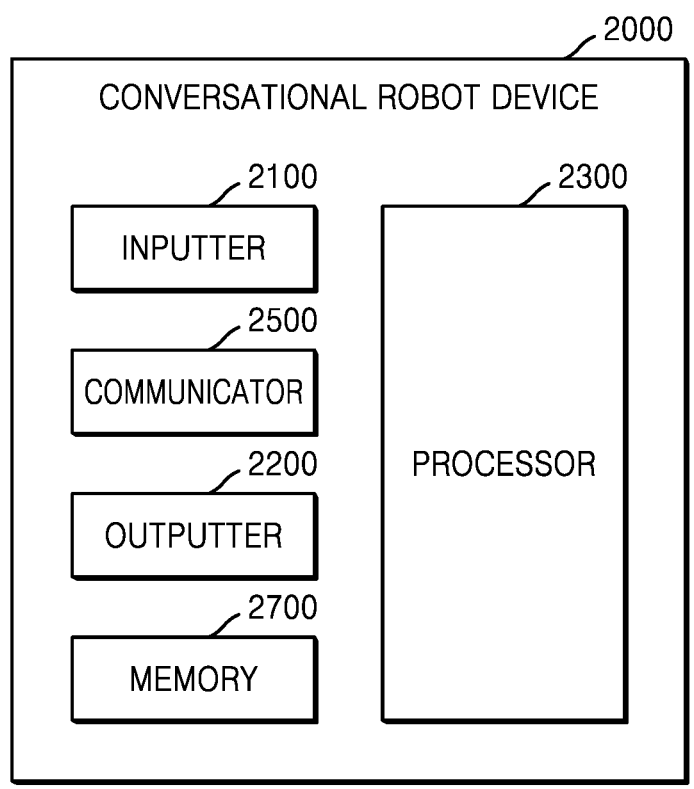
FIG. 18 is a block diagram illustrating an example configuration of a conversational robot device according to various embodiments of the disclosure.

FIG. 18 is a block diagram illustrating an example configuration of the conversational robot device 2000 according to various embodiments of the disclosure.

Referring to FIG. 18, the conversational robot device 2000 may include an inputter (e.g., including input circuitry) 2100, an outputter (e.g., including output circuitry) 2200, a communicator (e.g., including communication circuitry) 2500, a memory 2700, and a processor (e.g., including processing circuitry) 2300.

The inputter 2100 may include various input circuitry and receive a user input for controlling an operation of the conversational robot device 2000. Examples of the inputter 2100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, or the like. Furthermore, the inputter 2100 may include a component for receiving a user's voice input.

The outputter 2200 may include various output circuitry and output an audio signal or a video signal. The outputter 2200 may include a speaker (not shown) and a display (not shown). The speaker may output an acoustic signal related to a function performed by the conversational robot device 2000. The display displays and outputs information processed by the conversational robot device 2000. For example, the display may display a UI for controlling the conversational robot device 2000 and the external device 1000.

In addition, when the display and a touch pad form a layer structure to construct a touch screen, the display may be used as an input device as well as an output device.

The communicator 2500 may include various communication circuitry included in one or more communication modules that enable the conversational robot device 2000 to communicate with the external device 1000, the mobile device 3000, and the AI service providing server 4000. For example, the communicator 2500 may include, for example, and without limitation, a short-range wireless communicator and a mobile communicator. The short-range wireless communicator may include, for example, and without limitation, a Bluetooth communication module, a BLE communication module, a NFC module, a WLAN (Wi-Fi) communication module, a Zigbee communication module, an IrDA communication module, a WFD communication module, an UWB communication module, an Ant+ communication module, or the like, but is not limited thereto. The mobile communicator may transmit and/or receive a wireless signal to or from at least one of a base station, an external terminal, or a server on a mobile communication network. In this case, the wireless signal may be a voice call signal, a video call signal, or data in any one of various formats according to transmission and reception of a text/multimedia message.

The memory 2700 may store programs for controlling operations of the conversational robot device 2000. The memory 2700 may include at least one instruction for controlling operations of the conversational robot device 2000. Furthermore, the memory 2700 may store, for example, data for registering the external device 1000, a function tree of the external device 1000, data for registering a virtual device, a function tree of the virtual device, etc. The memory 2700 may also store an AI model for registering the external device 1000, an AI model for generating a function tree of the external device 1000, an AI model for creating a virtual device, an AI model for generating a function tree of the virtual device, an AI model for interpreting a user's voice input, an AI model for controlling the external device 1000 based on the user's voice input, etc. Programs stored in the memory 2700 may be classified into a plurality of modules according to their functions.

The memory 2700 may include at least one type of storage medium, for example, a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

The processor 2300 may include various processing circuitry and control all operations of the conversational robot device 2000. For example, the processor 2300 may control the inputter 2100, the outputter 2200, the communicator 2500, and the memory 2700 by executing programs stored in the memory 2700. The processor 2300 may control functions of the conversational robot device 2000 in the disclosure by controlling the inputter 2100, the outputter 2200, the communicator 2500, and the memory 2700. The processor 2300 controls the inputter 2100, the outputter 2200, the communicator 2500, and the memory 2700 such that the conversational robot device 2000 may register the external device 1000, generate a function tree of the external device 1000, create a virtual device, generate a function tree of the virtual device, and control the external device 1000 based on a user's voice input.

Figure 19:
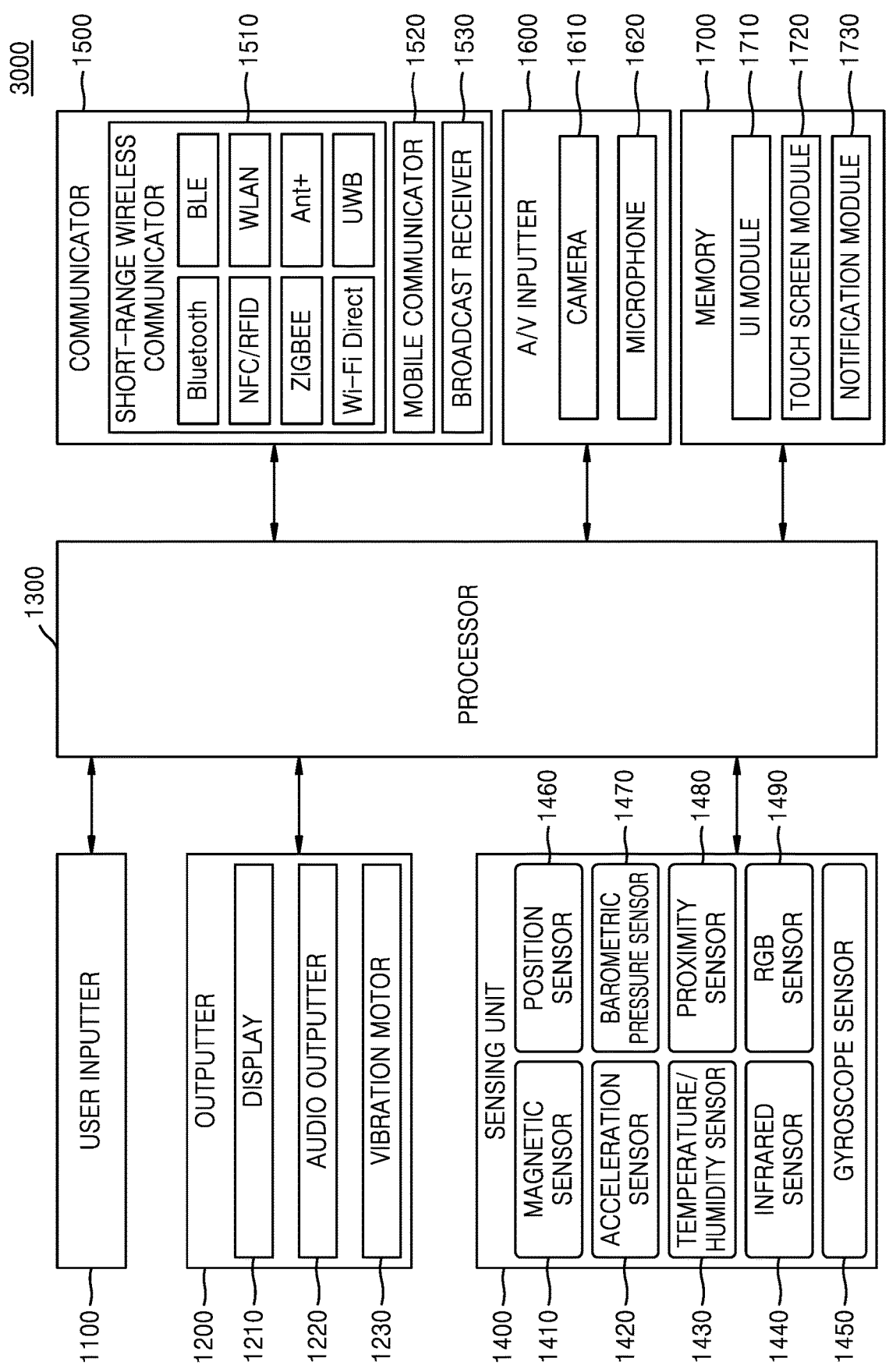
FIG. 19 is a block diagram illustrating an example configuration of a mobile device according to various embodiments of the disclosure.

FIG. 19 is a block diagram illustrating an example configuration of the mobile device 3000 according to some embodiments of the disclosure.

Referring to FIG. 19, the mobile device 3000 may include a user inputter (e.g., including input circuitry) 1100, an outputter (e.g., including output circuitry) 1200, a processor (e.g., including processing circuitry) 1300, a sensing unit (e.g., including various sensors) 1400, a communicator (e.g., including communication circuitry) 1500, an audio/video (A/V) inputter (e.g., including A/V input circuitry) 1600, and a memory 1700.

The user inputter 1100 may include various input circuitry via which the user inputs data necessary for controlling the mobile device 3000 Examples of the user inputter 1100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

The user inputter 1100 may receive a user input related to an operation of the conversational robot device 2000. The user inputter 1100 may receive a user input for controlling an operation of the conversational robot device 2000, a user input for performing settings related to the conversational robot device 2000.

The outputter 1200 may include various output circuitry and output an audio signal, a video signal, or a vibration signal, or the like, and may include a display 1210, an audio outputter 1220, and a vibration motor 1230, etc.

The display 1210 displays and outputs information processed by the mobile device 3000. For example, the display 1210 may display UIs related to operations of the conversational robot device 2000 and settings with respect thereto.

In addition, when the display 1210 and a touch pad form a layer structure to construct a touch screen, the display 1210 may be used as an input device as well as an output device.

The audio outputter 1220 may include various audio output circuitry and output audio data received from the communicator 1500 or stored in the memory 1700. The audio outputter 1220 may also output acoustic signals associated with functions performed by the mobile device 3000 (e.g., a call signal reception sound, a message reception sound, and a notification sound). The audio outputter 1220 may include a speaker, a buzzer, etc.

The processor 1300 may include various processing circuitry and controls overall operations of the mobile device 3000. For example, the processor 1300 may control the user inputter 1100, the outputter 1200, the sensing unit 1400, the communicator 1500, and the A/V inputter 1600 in its entirety by executing programs stored in the memory 1700.

The processor 1300 may perform at least some of the operations of the conversational robot device 2000 in the disclosure by controlling the user inputter 1100, the outputter 1200, the sensing unit 1400, the communicator 1500, and the A/V inputter 1600. For example, while the conversational robot device 2000 may provide an operation of receiving a user's voice input and outputting output data to be provided to the user, the mobile device 3000 may provide a function for managing the external device 1000 used by the user. For example, the mobile device 3000 may also perform functions for controlling an operation of the conversational robot device 2000 and performing settings related to the operation of the conversational robot device 2000. For example, the mobile device 300 may also manage at least some of the AI models presented in the disclosure.

The sensing unit 1400 may include various sensors and detect a status of the mobile device 3000 or the surroundings thereof and transmit information about the detected status to the processor 1300.

The sensing unit 1400 may include, for example, and without limitation, at least one of a magnetic sensor 1410, an acceleration sensor 1420, a temperature/humidity sensor 1430, an infrared sensor 1440, a gyroscope sensor 1450, a position sensor (e.g., a global positioning system (GPS)) 1460, a barometric pressure sensor 1470, a proximity sensor 1480, an RGB sensor (an illuminance sensor) 1490, or the like, but is not limited thereto. Because functions of the above-described sensors may be inferred intuitively by those of ordinary skill in the art, detailed descriptions thereof may not be provided below.

The communicator 1500 may include one or more components including various communication circuitry that enable the mobile device 3000 to communicate with the external device 1000, the conversational robot device 2000, and the AI service providing server 4000. For example, the communicator 1500 may include a short-range wireless communicator 1510, a mobile communicator 1520, and a broadcast receiver 1530. The communicator 1500 may exchange information necessary for controlling the external device 1000 by interpreting a user's voice input with the external device 1000, the conversational robot device 2000, and the AI service providing server 4000. The short-range wireless communicator 1510 may include, for example, and without limitation, Bluetooth, Bluetooth Low Energy (BLE), near-field communication/radio frequency identification (NFC/RFID), Zigbee, Wi-Fi direct, Ant+, WLA/V, UWB, or the like.

The A/V inputter 1600 may include various A/V input circuitry for inputting an audio or video signal may include, for example, a camera 1610, a microphone 1620, etc. The camera 1610 may acquire an image frame such as a still or moving image via an image sensor in a video call mode or capture mode. An image captured via the image sensor may be processed by the processor 1300 or a separate image processor (not shown).

The microphone 1620 may receive an external acoustic signal and convert the acoustic signal into electrical audio data. For example, the microphone 1620 may receive an acoustic signal from an external device or a speaking person.

The memory 1700 may store programs necessary for processing or control operations performed by the processor 1300 or store data input to or output from the mobile device 300.

The memory 1700 may include at least one type of storage medium, for example, a flash memory-type memory, a hard disk-type memory, a multimedia card micro-type memory, a card-type memory (e.g., an SD card or an XD memory), RAM, SRAM, ROM, EEPROM, PROM, a magnetic memory, a magnetic disc, or an optical disc.

Programs stored in the memory 1700 may be classified into a plurality of modules according to their functions, such as, for example, and without limitation, a UI module 1710, a touch screen module 1720, and a notification module 1730, etc.

Figure 20:
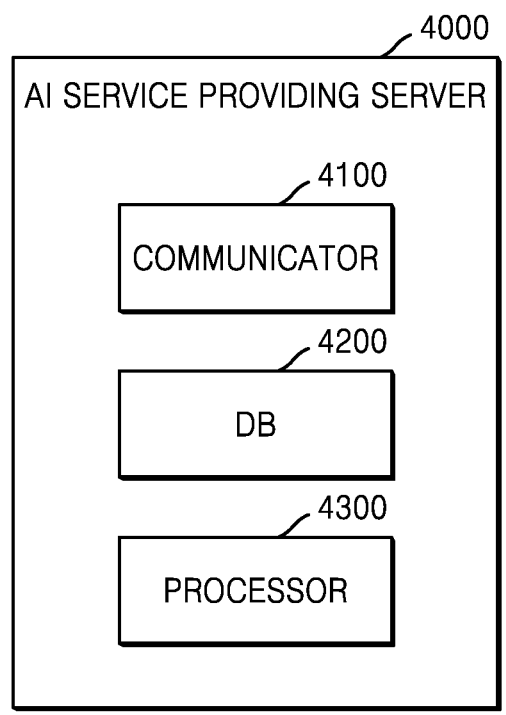
FIG. 20 is a block diagram illustrating an example configuration of an artificial intelligence (AI) service providing server according to various embodiments of the disclosure.

FIG. 20 is a block diagram illustrating an example configuration of the AI service providing server 4000 according to various embodiments of the disclosure.

Referring to FIG. 20, the AI service providing server 4000 may include a communicator (e.g., including communication circuitry) 4100, a database (DB) 4200, and a processor (e.g., including processing circuitry) 4300.

The communicator 4100 may include various communication circuitry included, for example, in one or more communication modules that enable the AI service providing server 4000 to communicate with the external device 1000, the conversational robot device 2000, and the mobile device 3000. For example, the communicator 4100 may include a short-range wireless communicator and a mobile communicator. The short-range wireless communicator may include a Bluetooth communication module, a BLE communication module, a NFC module, a WLA/V (Wi-Fi) communication module, a Zigbee communication module, an IrDA communication module, a WFD communication module, an UWB communication module, and an Ant+ communication module, but is not limited thereto. The mobile communicator may transmit and/or receive a wireless signal to or from at least one of a base station, an external terminal, or a server on a mobile communication network. In this case, the wireless signal may be a voice call signal, a video call signal, or data in any one of various formats according to transmission and reception of a text/multimedia message.

The DB 4200 may store programs for controlling operations of the AI service providing server 4000. The DB 4200 may include at least one instruction for controlling operations of the AI service providing server 4000. Furthermore, the DB 4200 may store, for example, profile information and a function tree of the external device 1000, profile information and a function tree of a virtual device, data for generating the function tree of the external device 1000, data for generating the function tree of the virtual device, data for providing an AI service to the user, etc. The DB 4200 may also store an AI model for registering the external device 1000, an AI model for generating a function tree of the external device 1000, an AI model for creating a virtual device, an AI model for generating a function tree of the virtual device, an AI model for interpreting a user's voice input, an AI model for controlling the external device 1000 based on the user's voice input, etc. Programs stored in the DB 4200 may be classified into a plurality of modules according to their functions.

The DB 4200 may include a plurality of DBs to manage, for each user account, information about an identification value of the conversational robot device 2000, an identification value of the external device 1000, a function tree of the external device 1000, an identification value of a virtual device, a function tree of the virtual device, a service category related to the user, a user's service usage history, etc. Furthermore, at least some of the pieces of information stored for each user account may be shared among users.

The processor 4300 may include various processing circuitry and control overall operations of the AI service providing server 4000. For example, the processor 4300 may control the communicator 4100 and the DB 4200 by executing programs stored in the DB 4200. By controlling the communicator 4100 and the DB 4200, the processor 4300 may provide data necessary for controlling the external device 1000 in response to a user's voice input in the disclosure to the conversational robot device 2000, the mobile device 3000, and the external device 1000.

The processor 4300 may perform at least some of the operations of the conversational robot device 2000 presented in the disclosure. For example, while the conversational robot device 2000 may provide an operation of receiving a user's voice input and outputting output data to be provided to the user, the AI service providing server 4000 may provide a function of managing the external device 1000 used by the user. For example, the AI service providing server 4000 may also perform functions for controlling an operation of the conversational robot device 2000 and performing settings related to the operation of the conversational robot device 2000. For example, the AI service providing server 4000 may also manage at least some of the AI models presented in the disclosure.

In addition, the conversational robot device 2000 and the AI service providing server 400 may interwork with each other to perform registration of the external device 1000, generation of a function tree of the external device 1000, creation of a virtual device, generation of a function tree of the virtual device, interpretation of a user's voice input, and control of the external device 1000.

The AI service providing server 4000 may generate AI models for registering the external device 1000, generating the function tree of the external device 1000, creating the virtual device, generating the function tree of the virtual device, interpreting the user's voice input, and controlling the external device 1000.

The conversational robot device 2000 may perform registration of the external device 1000, generation of a function tree of the external device 1000, creation of a virtual device, generation of a function tree of the virtual device, interpretation of a user's voice input, and control of the external device 1000 by taking data selected for at least one of the registration of the external device 1000, the generation of the function tree of the external device 1000, the creation of the virtual device, the generation of the function tree of the virtual device, the interpretation of the user's voice input, or the control of the external device 1000 as input to at least one AI model generated by the AI service providing server 4000. For example, the conversational robot device 2000 may transmit to the AI service providing server 4000 data selected for at least one of registration of the external device 1000, generation of a function tree of the external device 1000, creation of a virtual device, generation of a function tree of the virtual device, interpretation of a user's voice input, or control of the external device 1000 and request the AI service providing server 4000 to apply the data transmitted to the AI service providing server 4000 to an AI model. In addition, the conversational robot device 2000 may receive, from the AI service providing server 4000, information about a profile for registering the external device 1000, a function tree of the external device 1000, attributes of a virtual device, a function tree of the virtual device, a value of interpretation of a user's voice input, and command sets for controlling the external device 1000, the information being generated by the AI service providing server 4000.

The conversational robot device 2000 may receive at least one AI model generated by the AI service providing server 4000 from the AI service providing server 4000 and perform registration of the external device 1000, generation of a function tree of the external device 1000, creation of a virtual device, generation of a function tree of the virtual device, interpretation of a user's voice input, and control of the external device 1000 using the received AI model.

Embodiments of the disclosure may be implemented through computer-readable recording media having recorded thereon computer-executable instructions such as program modules that are executed by a computer. The computer-readable recording media may be any available media that can be accessed by a computer and include both volatile and nonvolatile media and both detachable and non-detachable media. Furthermore, the computer-readable recording media may include computer storage media and communication media. The computer storage media include both volatile and nonvolatile and both detachable and non-detachable media implemented by any method or technique for storing information such as computer-readable instructions, data structures, program modules, or other data. The communication media typically embody computer-readable instructions, data structures, or program modules, and include any information transmission media.

In the disclosure, the term "unit" may include a hardware component such as a processor or circuit and/or a software component that is executed by a hardware component such as a processor.

The above description of the disclosure is provided for illustration, and it will be understood by those of ordinary skill in the art that various changes in form and details may be readily made therein without departing from essential features and the spirit and scope of the disclosure including the following claims. Accordingly, the above embodiments of the disclosure and all aspects thereof are examples only and are not limiting. For example, each component defined as an integrated component may be implemented in a distributed fashion. Likewise, components defined as separate components may be implemented in an integrated manner.

The scope of the disclosure is not limited by the detailed description thereof and includes the appended claims, and all the changes or modifications within the scope of the appended claims and their equivalents will be understood as being included in the scope of the disclosure.

What is claimed is:

1. A method, performed by a conversational robot device, of registering an external device, the method comprising:
   receiving profile information from a plurality of external devices;
   selecting a service category of a service provided by the conversational robot device;
   selecting at least one external device related to the selected service category from among the plurality of external devices;
   generating a function tree including at least some functions of the selected at least one external device; and
   registering the function tree and the service category with a server.

2. The method of claim 1, wherein the receiving of the profile information comprises:
establishing short-range wireless communication with the plurality of external devices; and
receiving the profile information in a preset format from the plurality of external devices.

3. The method of claim 1, wherein the generating of the function tree comprises: extracting information about attributes and functions of the selected at least one external device from the profile information of the selected at least one external device; and generating the function tree based on the extracted information.

4. The method of claim 1, wherein the generating of the function tree comprises generating the function tree by hierarchically connecting the at least some functions of the selected at least one external device.

5. The method of claim 1, wherein the selecting of the at least one external device comprises selecting a first external device and a second external device from among the plurality of external devices, and
the generating of the function tree comprises generating the function tree by hierarchically connecting at least some functions of the first external device and at least some functions of the second external device.

6. The method of claim 5, further comprising creating a virtual device including the at least some functions of the first external device and the at least some functions of the second external device,
wherein the function tree is matched to the virtual device and the service category and registered with the server.

7. The method of claim 1, further comprising:
receiving profile information from a new external device;
acquiring history information indicating a service usage history;
extracting information about attributes and functions of the new external device from the profile information received from the new external device; and
updating the function tree based on the service usage history information and the information about the attributes and functions of the new external device.

8. The method of claim 1, further comprising:
accessing the server;
displaying a service category list received from the server; and
selecting a specific category from the service category list.

9. The method of claim 8, further comprising:
displaying a function tree list corresponding to the selected specific category;
selecting a specific function tree from the function tree list;
receiving the selected specific function tree from the server; and
controlling the plurality of external devices based on the received selected specific function tree.

10. The method of claim 9, further comprising:
receiving a voice command;
generating, based on the received selected specific function tree, a query message complementing the received voice command; and
outputting the generated query message.

11. A conversational robot device configured to register an external device, the conversional robot device comprising:
a communication interface comprising communication circuitry configured to communicate with a plurality of external devices and a server;
a memory configured to store one or more instructions; and
a processor configured to execute the one or more instructions to control the conversational robot device to:
receive profile information from the plurality of external devices;
select a service category of a service provided by the conversational robot device;
select at least one external device related to the selected service category from among the plurality of external devices;
generate a function tree including at least some functions of the selected at least one external device; and
register the function tree and the service category with the server.

12. The conversational robot device of claim 11, wherein the processor is configured to execute the one or more instructions to further control the conversational robot device to: establish short-range wireless communication with the plurality of external devices; and receive the profile information in a preset format from the plurality of external devices.

13. The conversational robot device of claim 11, wherein the processor is configured to execute the one or more instructions to further control the conversational robot device to: extract information about attributes and functions of the selected at least one external device from the profile information of the selected at least one external device; and generate the function tree based on the extracted information.

14. The conversational robot device of claim 11, wherein the processor is configured to execute the one or more instructions to further control the conversational robot device to generate the function tree by hierarchically connecting the at least some functions of the selected at least one external device.

15. The conversational robot device of claim 11, wherein the processor is configured to execute the one or more instructions to further control the conversational robot device to:
select a first external device and a second external device from among the plurality of external devices; and
generate the function tree by hierarchically connecting at least some functions of the first external device and at least some functions of the second external device.

16. The conversational robot device of claim 15, wherein the processor is configured to execute the one or more instructions to further control the conversational robot device to: create a virtual device including the at least some functions of the first external device and the at least some functions of the second external device,
wherein the function tree is matched to the virtual device and the service category and registered with the server.

17. The conversational robot device of claim 11, wherein the processor is configured to execute the one or more instructions to further control the conversational robot device to: receive profile information from a new external device; acquire history information indicating a service usage history of the new external device; extract information about attributes and functions of the new external device from the profile information received from the new external device; and update the function tree based on the service usage history information and the information about the attributes and functions of the new external device.

18. The conversational robot device of claim 11, wherein the processor is configured to execute the one or more instructions to further control the conversational robot device to: access the server; display a service category list received from the server; and select a specific category from the service category list.

19. The conversational robot device of claim 18, wherein the processor is configured to execute the one or more instructions to further control the conversational robot device to: display a function tree list corresponding to the selected specific category; select a specific function tree from the function tree list; receive the selected specific function tree from the server; and control the plurality of external devices based on the received selected specific function tree.

20. A computer program product comprising a non-transitory computer readable recording medium having stored therein a program for performing operations comprising:
   receiving profile information from a plurality of external devices;
   selecting a service category of a service provided by a conversational robot device;
   selecting at least one external device related to the selected service category from among the plurality of external devices;
   generating a function tree including at least some functions of the selected at least one external device; and
   registering the function tree and the service category with a server.

* * * * *